United States Patent
Yoshikawa et al.

(10) Patent No.: US 6,249,532 B1
(45) Date of Patent: Jun. 19, 2001

(54) INTERACTIVE CHARGEABLE COMMUNICATION SYSTEM WITH BILLING SYSTEM THEREFOR

(75) Inventors: Kazuhiko Yoshikawa; Hitoaki Owashi; Hiroyuki Hayakawa, all of Yokohama; Tadasu Otsubo, Chigasaki; Kyoichi Hosokawa, Yokohama, all of (JP)

(73) Assignees: Hitachi, Ltd.; Hitachi Microcomputer Systems, Ltd., both of Tokyo (JP)

( * ) Notice: Subject to any disclaimer, the term of this patent is extended or adjusted under 35 U.S.C. 154(b) by 0 days.

(21) Appl. No.: 09/237,698

(22) Filed: Jan. 26, 1999

Related U.S. Application Data

(63) Continuation of application No. 08/385,274, filed on Feb. 8, 1995, now Pat. No. 6,002,694.

(30) Foreign Application Priority Data

Feb. 17, 1994 (JP) ......................................................... 6-20130
Feb. 17, 1994 (JP) ......................................................... 6-20131
Feb. 17, 1994 (JP) ......................................................... 6-20132

(51) Int. Cl.$^7$ ................................. H04J 3/12; H04H 1/04
(52) U.S. Cl. .......................... 370/486; 370/522; 370/527; 725/1; 725/28; 725/100; 380/233; 380/241
(58) Field of Search ..................................... 370/270, 432, 370/485, 486, 487, 522, 528, 527, 496, 390; 348/3, 7, 10; 455/5.1, 6.1, 42; 714/748; 380/233, 241, 279, 234; 725/1, 25, 86, 87, 100, 28

(56) References Cited

U.S. PATENT DOCUMENTS

| | | | |
|---|---|---|---|
| 4,833,710 | 5/1989 | Hirashima | 380/233 |
| 4,893,248 | 1/1990 | Pitts et al. | 705/400 |
| 5,029,107 | 7/1991 | Gammie | 345/431 |
| 5,046,090 | 9/1991 | Walker et al. | 380/239 |
| 5,070,400 | 12/1991 | Lieberman | 725/151 |
| 5,132,992 | 7/1992 | Yurt et al. | 725/100 |
| 5,323,244 | 6/1994 | Yamagichi et al. | 380/202 |
| 5,357,276 | 10/1994 | Banker et al. | 725/102 |
| 5,367,571 | 11/1994 | Bowen et al. | 380/242 |
| 5,400,402 | 3/1995 | Garfinkle | 380/231 |
| 5,446,488 | 8/1995 | Vogel | 725/151 |
| 5,490,199 | 2/1996 | Fuller et al. | 379/100.05 |
| 5,592,551 | 1/1997 | Lett et al. | 348/906 |
| 5,864,358 | * 1/1999 | Suzuki et al. | 370/486 |

* cited by examiner

Primary Examiner—Seema S. Rao
(74) Attorney, Agent, or Firm—Mattingly, Stanger & Malur, P.C.

(57) ABSTRACT

A billing system for use in a chargeable program broadcasting is capable of reliably billing a subscriber for program reception while preventing unauthorized reception thereof. A receiving terminal includes a primary terminal 100 and a secondary terminal 150. The primary terminal 100 receives a compressed video signal and confirms by an error checker 113 thereof whether there is a transmission error and bills, by a billing device 114 thereof, the receiving subscriber on the basis of an error information and a program information, etc., separated from the video signal by a separation circuit 112. The compressed video data is time-axis multiplexed with a terminal identifying code and a key signal and transmitted to the secondary terminal 150. In the secondary terminal 150, a bill for the subscriber is confirmed by the terminal identifying code and the compressed data is decoded by a decoder circuit 166 thereof.

39 Claims, 11 Drawing Sheets

FIG. 11

SUBSCRIBER TERMINAL → INFO. SUPPIER (INFO. LIST REQUEST)

| ST | SUBSCRIBER # | INFO. LIST REQUEST | EOD |

1101

INFO. SUPPIER → SUBSCRIBER TERMINAL (INFO. LIST REQUEST)

| ST | USE CONDITION | BILL CONDITION | INFO. LIST | COMPRESSING INFO. | EOD |

1102

SUBSCRIBER TERMINAL → INFO. SUPPIER (FIRST REQUEST)

| ST | SUBSCRIBER # | INFO. REQUEST | INFO. MANAGE # | CONDITION | EOD |

1103

INFO. SUPPIER → SUBSCRIBER TERMINAL (FIRST DATA TRANSMIT)

| ST | USE CONDITION | BILL CONDITION | ID | COMPRESSED DATA | EOD |

1104

| TC | COMPRESSED DATA | TC | COMPRESSED DATA | TC | { DATA |

SUBSCRIBER TERMINAL → INFO. SUPPIER (SECOND REQUEST)

| ST | SUBSCRIBER # | ATTRIBUTE INFO. REQUEST | INFO. MANAGE # | ID | EOD |

1105

INFO. SUPPIER → SUBSCRIBER TERMINAL (SECOND DATA TRANSMIT)

| ST | USE CONDITION | BILL CONDITION | ID | COMPRESSED DATA | EOD |

1106

| TC | QUANTIZATION TABLE | QUANTIZATION COEFFICIENT | TC | QUANTIZATION TABLE | } { QUANTIZATION COEFFICIENT |

INFO. SUPPIER → BANKING SYSTEM TERMINAL (BILLING)

| ST | SUPPIER # | SUBSCRIBER # | SUBSCRIBER ACCOUNT # | AMOUNT OF BILL | EOD |

1107

INTERACTIVE CHARGEABLE COMMUNICATION SYSTEM WITH BILLING SYSTEM THEREFOR

This is a divisional of application Ser. No. 08/385,274 filed Feb. 8, 1995, no U.S. Pat. No. 6,002,694.

BACKGROUND OF THE INVENTION

The present invention relates to an interactive, chargeable communication system with a billing system for chargeable program which may be obtained by compressing video or audio information, a character information, data or application program and transmitted from a multi-channel program communication service company, etc., through an interactive communication cable, ground wave, satellite wave or telephone line, etc., for the purpose of, for example, program request and home shopping, etc. Particularly, the present invention relates to a chargeable broadcasting system in which a user receiving a scrambled program can watch and/or hear a program by descrambling the program by using a dedicated decoder while paying therefor based on Pay-Per-View (PPV) system in which only program received by the user is billed.

Beside the conventional ground broadcasting in which a program video is transmitted to respective homes through the use of VHF or UHF wave, a cable broadcasting for directly transmitting program from a relay transmitter to respective home terminals by using cables such as coaxial cables or optical cables extending therebetween is becoming popular and, particularly, a number of cable broadcasting enterprises are being established for providing multi-channel services owing to the fact that transmission of programs using communication satellites or broadcasting satellites becomes possible recently.

Further, with developments of optical fiber technology, digital transmission technology and high efficiency coding technology, a communication service such as entertainment program delivery system, etc., which may substitute for the rental video and in which a desired program is viewed at desired time by program request using interactive communication cable, such as home shopping or Video-On-Demand (VOD) program, have been studied.

Such cable broadcasting or VOD system transmits video signal through a coaxial cable, etc. Therefore, there is no radio fault such as ghost which occurs frequently in the program broadcasting using ground wave. Further, such system can be used for a re-transmission of a usual program delivered by using ground wave and for broadcastings specific to program delivery companies.

Each viewer makes a contract with service companies of such as VOD and can view the re-transmission of program of the ground wave broadcasting supplied by cable broadcasting companies or service companies without radio fault by connecting a dedicated receiving terminal to his video signal display device such as television receiver. Further, it becomes possible to view film drama, various sports relayed and music programs from such companies without using any special equipment other than the dedicated terminal. Further, by connecting a video signal recording/reproducing apparatus such as VTR to the dedicated terminal, it is possible to record these programs.

On the other hand, the service company transmits program video software to only the viewers who made contract with it. Therefore, for the service company, it is desired to provide their programs to only viewers which made contract with it and are chargeable. That is, any system according to which unauthorized viewers who did not make contract with a service company can view programs supplied by the company is not desired by the service company. In the conventional system, it is impossible for any one having no dedicated terminal to directly receive programs from such service company and view them on a television receiver. However, when a program received by a dedicated terminal is copied by using, for example, a VTR, the copy can be viewed easily by any one who has no dedicated terminal. That is, in the conventional system, it is impossible to prevent such unauthorized view of programs supplied from a service company.

In the BS standard scrambling system disclosed in, for example, K. Kobayashi, "1-2 Scrambled Broadcasting by BS", the Journal of Television Engineers Society, Vol. 46, No. 4. pp. 387 to 391 (1992), a content of program is scrambled and a viewer who makes contract with a broadcasting company for each channel views it by descrambling the program by means of a dedicated decoder.

The billing in the disclosed system is based on the Flat-Fee system in which a constant viewing fee is charged for all programs. On the other hand, there is another billing system called Pay-Per-View (PPV) in which a viewer views only program he wants to see and pays a fee for it. The PPV is classified to Pay-Per-Time (PPT) in which a viewer is charged for time for which he viewed the program and Pay-Per-Program (PPP) in which a viewer is charged for each program he viewed and the PPP is sub-classified to Video-On-Demand (VOD) in which program data requested by each viewer is transmitted to him and Near-Video-On-Demand (NVOD) in which a viewer selects any of channels on which a single program is continuously broadcasted with broadcasting time being shifted.

In a chargeable broadcasting using the PPP billing system, it may be considered that programs scrambled in any of a plurality of ways are broadcasted through a single channel and a viewer selects any of the programs, descrambles it and is charged for the selected and descrambled program. In such case, it is enough for a broadcasting side to merely broadcast the respective scrambled programs in sequence. However, a viewer must reconfirm contents of the programs by temporarily stopping them and, when he wants to view any or some of them, he must re-view the same program or programs by paying fee therefor or he must record data thereof on such as VTR while he is viewing it.

On the other hand, in CATV service, data is time-axis compressed and transmitted to each subscriber who stores the data in a digital recording device such as digital VTR (DVTR) and views it after decompression as in VOD. Since, in this case, it is possible to reproduce the recorded digital data at any time repeatedly without degradation, there may be a problem of infringement of copyright of a producer of the program.

Therefore, in such chargeable broadcasting, a new billing system must be provided by taking the unauthorized recording of digital data and the unauthorized dubbing into consideration. This problem may be solved by detecting a descrambling processing for a data received or reproduced from the DVTR and input to a decoder for descrambling and billing an owner of the decoder on the basis of the descrambling processing, since all views are billed and collection of fee is possible corresponding to a state of viewing.

In this case, however, since the billing side can not determine program content reproduced from the VTR when a viewer views it by means of DVTR, the PPP billing system can not be applied thereto. In addition, when a special reproduction of a program such as temporary stop, etc., in VTR, the same program is reproduced intermittently and therefore the number of views can not be determined clearly, causing determination of object to be billed to be difficult.

In view of these problems, it is effective to employ a billing system in which, for a program which is selected by a subscriber, the subscriber is given a permission of viewing the program for a time period measured in specific time unit, that is, the subscriber is permitted to descramble the program for the time period and he is billed in program unit within the time period rather than the number of views, as in the current cassette rental system of video software. This system is disclosed in, for example, Japanese Patent Application Laid-open (Kokai) No. H5-284499.

The interactive cable television in which an information, such as video or audio, character information or data, requested by a terminal connected to a network is scrambled by compressing it and transmitted to the terminal through the network is disclosed in, for example, Y. Mochida, "Digital Optical Cable TV", the Journal of Television Engineers Society, Vol. 47, No. 8. pp. 1082 to 1087 (1993).

In the above article, although the technology concerned to the system and services of such interactive cable television is disclosed, there is no disclosure about the billing system for subscribers having such terminals and the copyright protection.

SUMMARY OF THE INVENTION

An object of the present invention is to provide an interactive, chargeable communication system including a billing system, by which the billing to subscribers can be done reliably while preventing infringement of copyright of video software.

Another object of the present invention is to provide an information compressing and transmitting apparatus which is capable of protecting copyright of an information which may be video or audio information, character information, data or application programs, etc., and is transmitted and of billing subscribers having subscriber terminals receiving the information, by compressing the information according to a request or requests from a terminal or terminals connected to a network, dividing the compressed information together with its attribute information to a plurality of information and transmitting the respective divided information according to a plurality of requests from the respective terminals connected to the network.

In order to achieve the above objects, according to an aspect of the present invention, there are provided, in a terminal of the subscriber for receiving program video signal delivered from a program service company, an error check circuit for confirming an existence of transmission error in a communication route, a receiving monitor circuit for monitoring a program receiving condition such as program received and time of receiving in minute and a billing check circuit for checking a billing to a subscriber by determining a receiving fee according to an error condition and the receiving condition monitored.

Further, the subscriber terminal is composed of a primary terminal portion for processing video signal received in order to prevent unauthorized reception of the video signal and a secondary terminal portion connected to the video signal display device for displaying an actually received program on the monitor. The primary terminal portion includes a circuit for processing the received video signal to prevent unauthorized reception and a circuit for multiplexing an identification (ID) number, etc., by which the subscriber terminal receiving a delivered program or the subscriber on the video signal. The secondary terminal portion includes a circuit for confirming an existence of a bill for the subscriber on the basis of the ID number multiplexed in the primary terminal portion and a circuit for invalidating the unauthorized reception preventing processing performed in the primary terminal portion. The display device displays the program video after the confirmation is performed in the ID number confirming circuit.

According to this system, after the program delivered by the service company is received, it is confirmed by the error check circuit of the primary terminal portion of the subscriber terminal whether or not there is a transmission error and then the receiving time of the program in the primary terminal portion of the subscriber terminal and the kind, etc., of the program received are confirmed by the monitor circuit. On the basis of the error information and the program receiving information obtained from these circuits, the billing system bills the subscriber.

The video signal is scrambled by the unauthorized reception preventing circuit in the primary terminal portion of the receiving terminal and multiplexed with an ID number which is preliminarily set in the respective terminals and with which a specific terminal or subscriber can be specified and, then, output.

The video signal output from the primary terminal portion is supplied to the secondary terminal portion in which the ID number is separated. The billing state for that subscriber for the delivered program is confirmed by the ID number. That is, an ID number with which a subscriber terminal can be identified is preliminarily set in a primary and a secondary terminal portions of the subscriber terminal, and, when the ID number of the primary terminal portion which is multiplexed with the video signal in the primary terminal portion coincides with the ID number of the secondary terminal portion, it is judged that the subscriber having the terminal is billed. When it is confirmed that the secondary terminal portion is included in the terminal of the subscriber who is billed, the program is descrambled and displayed on the video display device.

In this system, since the video signal output from the primary terminal portion is scrambled, the video signal can not be displayed correctly unless it is descrambled in the secondary terminal portion. Therefore, even if the video signal output from the primary terminal portion is copied by using such as VTR and transferred to the third person, the latter can not view it on a monitor which is not connected to the secondary terminal portion. In other words, one who does not make contract with the program supplier can not view any program supplied by them. Further, the video signal output from the primary terminal portion is displayed on a video display device after charge on a subscriber is confirmed. Therefore, even when a magnetic tape, etc., on which a delivered program video is recorded by an authorized subscriber is transferred to another subscriber, the latter can not view the program since the video signal is not descrambled by other people than the authorized subscriber who has a secondary terminal portion which is paired with the primary terminal portion which receives the program, that is, who does not pay fee for reception of the program.

As mentioned, according to this system, monitoring of the program by non-subscribers and subscribers who do not receive a program by themselves are prevented and thus it is possible to protect the program suppliers and copyright owners against infringement.

In another aspect of the present invention, the objects can be achieved by transmitting from a transmitter side a video and audio data of a scrambled program together with a descrambling information and simultaneously transmitting a program ID information different every program, separately or multiplexing on the data.

A decoder for descrambling the data comprises decoder means for detecting the descrambling information from the received data and decoding it, a descrambler for descrambling operation, program ID information processing means for storing program ID information and comparing a program ID information of a program to be newly viewed with program ID information of programs which were viewed is the past and means for transmitting through a telephone line or a data line such as an up-link of an interactive communication line to a billing side program ID information of program which was descrambled and viewed, under control based on a result of the comparison performed by the program ID information processing means.

Alternatively, the decoder may include only the program ID information decoding means and a transmitting means and all results of detection performed thereby are transmitted to the billing side which is provided with means which performs an operation corresponding to that of the program ID information processing means.

When a user uses means such as DVTR for digitally recording a transmission data, the video and audio data before descrambling is recorded together with the descrambling information and the program ID information and, for reproducing them, the scrambled data, the descrambling information and the program ID information are demodulated and reproduced in the same format as that for recording.

In any way, the transmitter multiplexes the descrambling information and the scrambled program ID information on the video and audio data at a specific period and transmits.

A viewer detects by means of the decoder means the descrambling information and the program ID information from the data received by the descrambling decoder, restores the processing pattern at a time when the data is scrambled, according to the decoded descrambling information, and descrambles it by performing an inverse processing to the scrambling processing by the descrambler. The program ID information detected is compared with all programs which were viewed in a specific time and are stored in the program ID information processing means to see whether or not there is a program ID information coincident with the detected program ID information. If there is no coincidence detected, it is deemed as reception of a new program and the program ID information thereof is transmitted to the billing side and simultaneously it is stored in the program ID information processing means. The billing side gets a title of the program which is viewed by the subscriber from the received information and bills the subscriber correspondingly. On the other hand, when there is a coincidence, it is deemed as a re-viewing of a program within a specific time and the program ID information thereof is neither stored nor transmitted.

In a case where the data is recorded by the digital recording means such as DVTR and viewed by reproducing it, the scrambled data, the descrambling information and the program ID information are recorded simultaneously and the respective signals are simultaneously demodulated and reproduced in the same signal format as that in the recording time and they are supplied to the decoder in which they are processed usually.

Thus, the billing for viewing a scrambled program can be efficiently performed in program unit.

In another aspect of the present invention, the objects are achieved by an information compressing/transmitting apparatus comprising compression means for compressing data including such as video, audio, character information and application program, first memory means for storing the compressed data, second memory means for storing attribute information necessary for decompressing the compressed data and other management information, means for attaching a common identifying information to respective divided information, transmitting/receiving means for receiving requests from a plurality of terminals connected to a circuit and transmitting data stored in the first and second memory means according to a plurality of requests from the terminal and a receiving/transmitting control means.

The information compressing/transmitting apparatus compresses the video, audio, character information, data and application program according to the requests from the terminals connected to the network, resulting in a compressed data and an attribute information necessary for decompressing the compressed data. The compressed data is stored in the first memory and the attribute information is stored in the second memory together with other subscriber management information.

Upon a first and second information transmission requests from the terminals connected to the network, the data stored in the first and second memories are transmitted.

In general, the data stored in the first memory has a large amount of information and it takes a considerable time to transmit all of them by using the network. On the other hand, an amount data stored in the second memory is small and it can be transmitted within a very short time which may be ignored by the terminal subscriber.

According to this aspect, an information requested by a subscriber is compressed and then divided to a plurality of pieces to which a common ID information is attached, respectively. The compressed information pieces with the common ID information are transmitted. Thus, a copyright of the information can be protected and, when the first data of the information requested by the terminal subscriber is preliminarily received and stored, it is possible to receive the second data within the very short time and to reproduce the requested data. The billing for the subscriber can be done according to the number of requests of the second data.

BRIEF DESCRIPTION OF THE DRAWINGS

FIG. 11 shows a data format to be used in a communication between the information transmitter and subscriber terminals;

DETAILED DESCRIPTION OF THE PREFERRED EMBODIMENTS

A first embodiment of the present invention will be described with reference to FIGS. 1A to 3.

FIG. 1A and FIG. 1B are a block diagram of a video signal receiving terminal according to the first embodiment of the present invention when applied to display a program video transmitted through a wire broadcasting. The video signal receiving terminal, that is, a subscriber terminal, includes a primary terminal portion 100 shown in FIG. 1A and a secondary terminal portion 150 shown in FIG. 1B.

Figure 6:
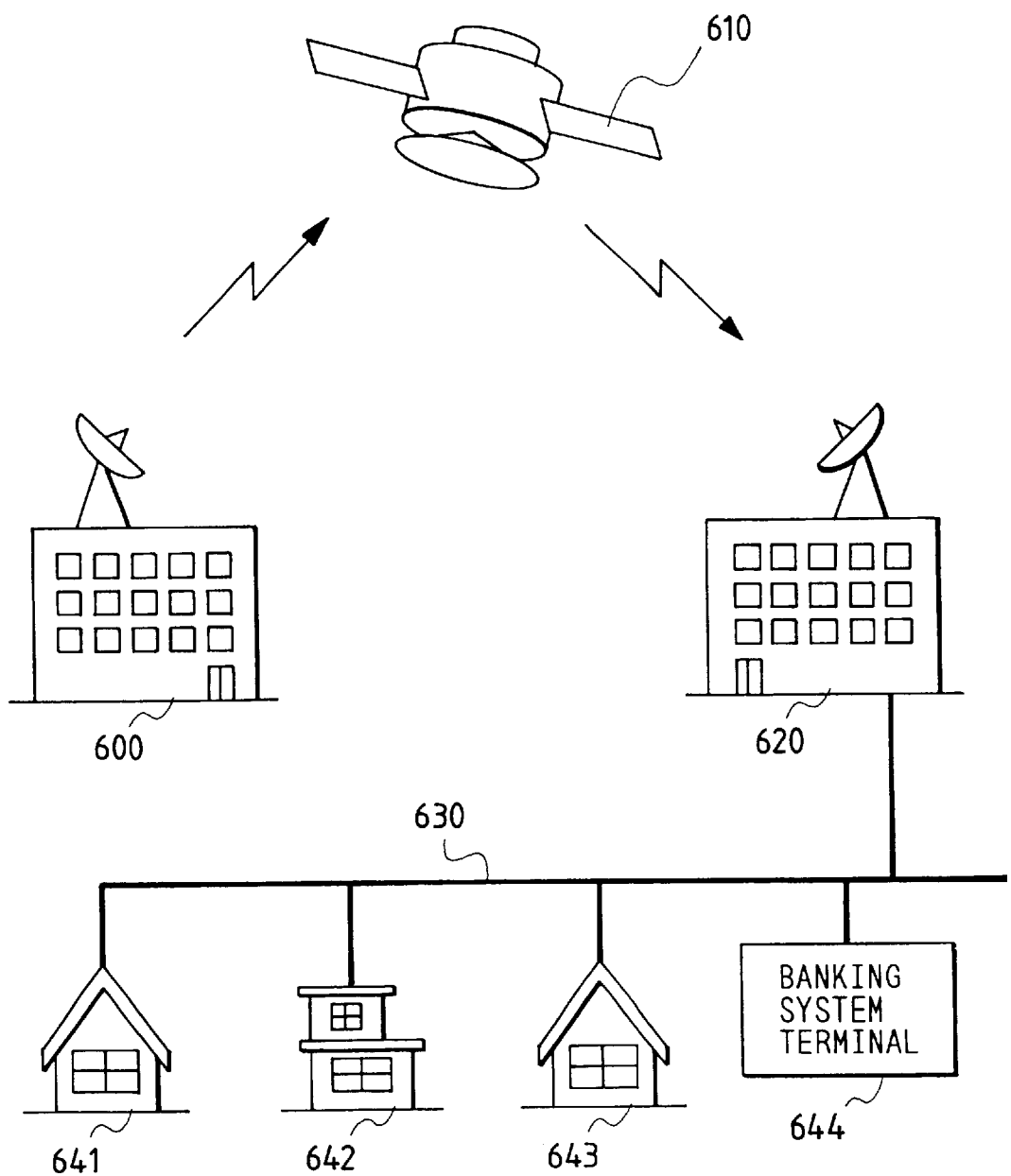
FIG. 6 shows an interactive communication network.

Before describing the subscriber terminal shown in FIG. 1A and FIG. 1B, a cable broadcasting system will be described in brief with reference to FIG. 6. In FIG. 6, the system includes a program supplying company 600 which produces a chargeable program and delivers it, a communication satellite (or broadcasting satellite) 610, a wire broadcasting relay transmitter 620, a communication cable 630 such as coaxial cable or optical cable which directly connected the relay transmitter to subscriber terminals 641, 642 and 643 and at least one terminal 644 of a banking system.

In the cable broadcasting system, the program produced by the program supplier 600 is transmitted through the communication satellite 610 or through ground wave to the relay transmitter 620. In the relay transmitter 620, the program signal transmitted from the program supplier 600 is received by using a large scale, high sensitivity antenna with signal degradation due to electromagnetic wave fault, etc., being minimized. The relay transmitter 620 transmits the received video signal through the cable 630 which may be a public digital communication line, such as Integrated Service Digital Network (ISDN) which is used concomitantly with other communications such as telephone line, facsimile line and a computer or a communication line dedicated to such as Cable Television (CATV), to the cable broadcasting receiving terminals 641 to 643 shown in FIG. 1A and FIG. 1B.

Figure 1:
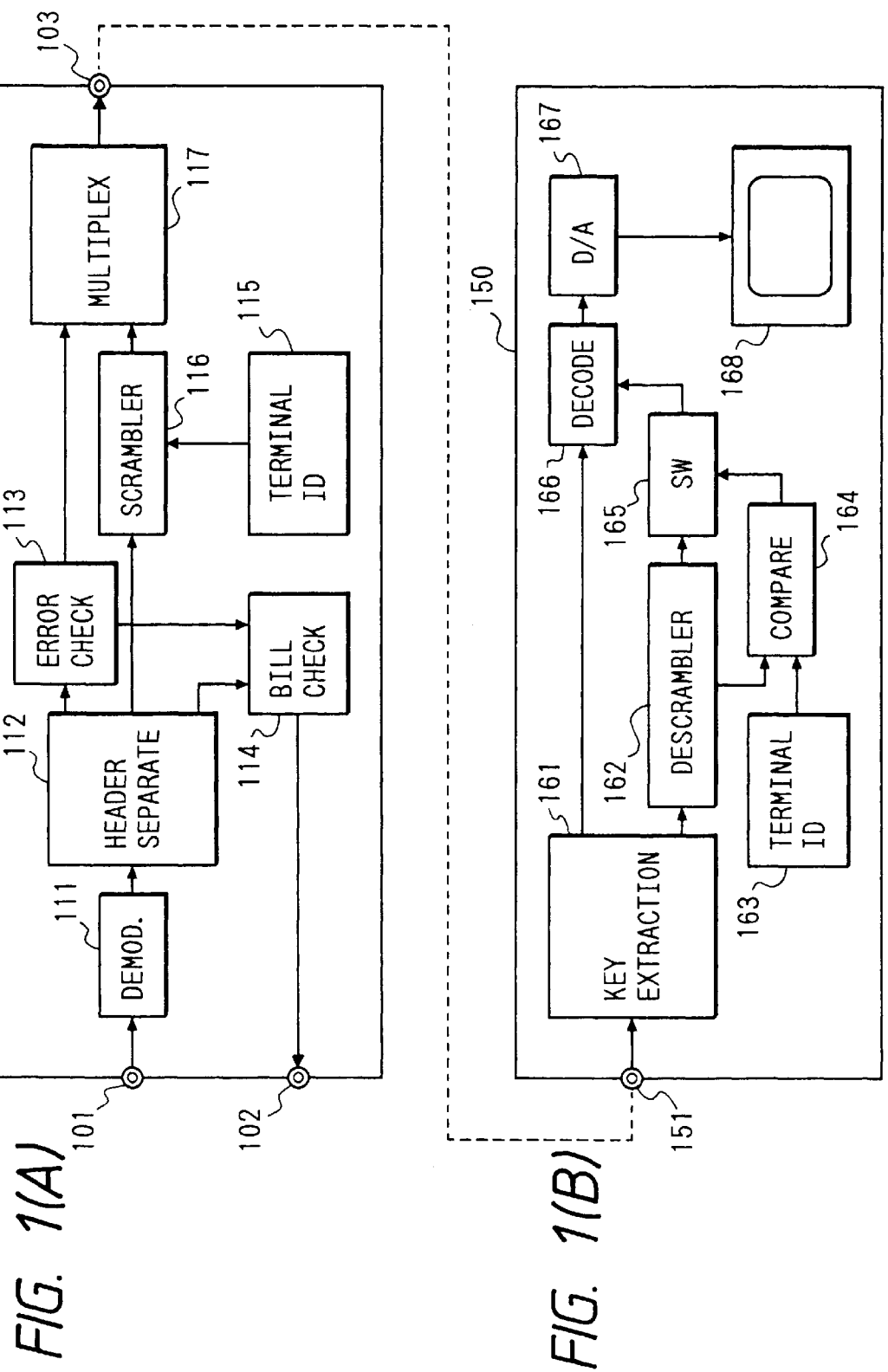
FIG. 1A and FIG. 1B are a block diagram of a video signal receiving terminal according to a first embodiment of the present invention.
Figure 2:
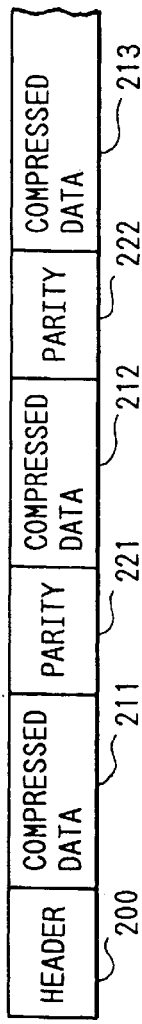
FIG. 2 shows an example of a data structure of a video signal transmitted from a program repeater in the first embodiment.

FIG. 2 shows an example of the data construction of the video signal transmitted from the relay transmitter to the respective subscriber terminals. In FIG. 2, the digital transmission data from the relay transmitter includes a data header portion 200 including key signals, etc., necessary to decoding a program information having various information of the program transmitted and the compressed video data, compressed video data portions 211 and 212, etc., and parity check portions 221 and 222, etc., inserted into the compressed data portion for detecting any error and confirming whether or not video signals were correctly received by the destination terminals.

In this embodiment, the digital data is constituted with the data header portion 200 of n bytes, the compressed video data portions 211, 212, . . . each of m bytes and the parity portions 221, 223, . . . each of 1 bytes where n is a natural number from several to ten and several, m is a natural number from several hundreds to several thousands and 1 is a natural number of several. The data header portion 200 is transmitted first in time, and, subsequent thereto, the compressed data portions 211, 212, 213, . . . and the parity portions 221, 222, . . . are transmitted alternately until an end of the program. That is, it is transmitted in the sequence of 211, 221, 212, 222, . . . Considering a receiving of the program on the way thereof, the data header portion 200 should be inserted into not only the head of the data but also a plurality of locations, preferably, every specific time.

Returning to FIG. 1A and FIG. 1B, the primary terminal portion 100 for receiving a program transmitted from the relay transmitter 620 includes an input terminal 101 for receiving the video signal from the relay transmitter 620, a billing information output terminal 102 for outputting a billing information for the reception of the program at the primary terminal portion 100, a video signal output terminal 103 for outputting a video signal scrambled in the primary terminal portion 100, a demodulator circuit 111 connected to the input terminal 101 for digitally demodulating the video signal input, a separation circuit 112 connected to an output of the demodulator circuit 111 for separating, from the digitally demodulated video signal from the demodulator circuit 111, the header portion 200 including a key signal necessary to decode the data header from the compressed video data and the parity portions, an error checker 113 for checking the compressed video data and the parity portion confirming whether or not the video signal transmitted from the relay transmitter is received correctly, a billing check circuit 114 for producing a billing information for the program reception fee on the basis of the program information separated by the separator circuit 112 and a result of the error check performed by the error checker 113, a memory 115 for storing an identification (ID) code specific to the primary terminal portion 100, a scrambler 116 for scrambling the decode key signal separated by the separator circuit 112 by multiplexing the key signal and a terminal ID code stored in the memory 115 and a multiplexer circuit 117 for time-axis multiplexing the compressed video data output from the error checker 113 with the key information scrambled by the scrambler 116.

The secondary terminal portion 150 shown in FIG. 1B includes an input terminal 151 connected to the video signal output terminal 103 of the primary terminal portion 100 for receiving the video signal scrambled therein, an extraction circuit 161 connected to the input terminal 151 for extracting the scrambled key information from the input video signal, a descrambler 162 for descrambling the key information extracted by the extraction circuit 161 and separating therefrom the decoding key and the terminal ID code specific to the primary terminal portion 100, a memory 163 for storing the terminal ID code of the primary terminal portion 100, a comparator 164 for comparing the terminal ID code of the primary terminal portion 100 separated in the descrambler 162 with the terminal ID code stored in the memory 163, a switch 165 for receiving a decode key output from the descrambler 162 and allowing the decoded key to pass therethrough according to an output of the comparator 164, a decode circuit 166 for decoding the compressed video signal by using the decode key passed through the switch 165, a D/A converter 167 for converting the decoded digital video signal from the decoder 166 into an analog signal and a monitor 168 for displaying the program video which is thus converted into the analog signal.

In this embodiment, the error check is performed by using the Cyclic Redundancy Check (CRC) code in each of the parity portions 221 and 222, etc., shown in FIG. 2. That is, in the relay transmitter, a compressed video data is processed by using special arithmetic operations, before the relay transmitter 620 transmits the video data, and an error detection code obtained thereby is attached to the compressed video data as a parity and, then, transmitted. In the receiving terminal side, that is, in the primary terminal portion 100, the received compressed video data is processed according to the same arithmetic operations and a result thereof is compared with the parity. If the result of the arithmetic operations is equal to the parity, it is determined that the compressed video data is correctly transmitted and received. The error checking code to be used in the error checker 113 is not limited to the CRC code. The Reed-Solomon code, the simple parity code or the Bose-Chaudhuri-Hocquenghem (BCH) code, etc., may be used therefor as well. By using such error correction code, a transmission error may be corrected depending upon the degree of error.

The result of error check using the CRC code, etc., output from the error checker 113 is input to the billing check circuit 114 together with the program information from the separation circuit 112. In the billing check circuit 114, a billing information for the subscriber is produced according to the error information from the error checker 113 and the program information attached to the received video signal. For example, when the program information is provided with the genre of program, the name of production company and the name of copyright owner, etc., it is possible to change the receiving fee according to the genre of the program, news or movie, and, in the VOD service, to make collection of receiving fee for the production company and/or the copyright owner or the service fee smooth. On the other hand, it is possible to reduce or even cancel the bill for the subscriber when the reception of the program is difficult due to transmission error which can be determined by using the error information. For example, when there is a transmission error, the subscriber terminal can transmit the error information to the relay transmitter 620 and request a re-transmission of a video signal corresponding to the error portion. It should be noted that the error checker 113 may be omitted if the communication route is error-free.

The billing information produced in the billing check circuit 114 is transmitted from the billing information output terminal 102 through telephone line or other lines or cables dedicated thereto to the relay transmitter 620 or the cable broadcasting company. Further, when the cable connected to the input terminal 101 of the primary terminal portion 100 for receiving the video signal is an interactive cable, it can be used for transmitting the billing information as well. In such case, the input terminal 101 is replaced by an input/output terminal and the billing information from the billing check circuit 114 is output through the input/output terminal. In such case, it is possible to not only reduce the number of communication cables connecting between the relay transmitter 620 and the respective subscriber terminals but also facilitate adaptation to the interactive communication service such as the program request in the VOD system. Further, it becomes possible to perform a precise research of view rate by performing the checking of program reception.

The key signal supplied from the separation circuit 112 to the scrambler 116 is scrambled and multiplexed with the terminal ID code specific to the primary terminal portion 100 and stored in the memory 115 as mentioned previously. The terminal ID code may be, for example, a binary number. In this case, it is preferable to assign different binary numbers to the respective subscriber terminals. However, it is possible to substantially prevent duplication of terminal ID number by using a binary number of 10 to 20 bits.

The key information which is scrambled in the scrambler 116 and multiplexed with the terminal ID code is input to the multiplexer circuit 117, together with the compressed video data, in which the key information and the compressed video data are time-axis multiplexed and output from the output terminal 103.

Figure 3:
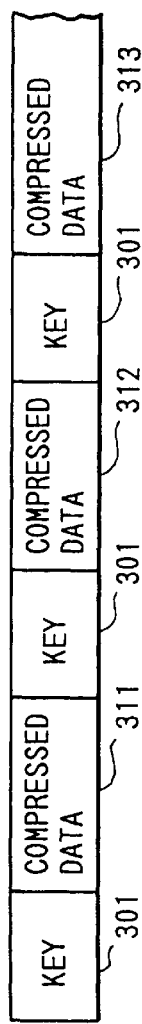
FIG. 3 shows an example of a data structure of a video signal transmitted between a primary and secondary terminal portions in the first embodiment.

FIG. 3 shows an example of a simple construction of the signal obtained by time-axis multiplex of the key information and the compressed video data. In FIG. 3, 301 depicts the key information and 311, 312 and 313, etc., depict the compressed video data. In the construction shown in FIG. 3, the key information 301 is inserted every constant time, for example, at least once per 5 minutes, taking into consideration the fact that the information are recorded on a recording medium such as VTR and may be reproduced from any point on the magnetic tape. In such case, when the reproduction of the magnetic tape is started on the compressed video data 312 subsequent to the key 301, the video data 312 can not be decoded since there is no key information thereof. However, it is possible to decode the video data from the compressed video data 313 with using the subsequent key 301. When the recording/reproducing apparatus to be used is a randomly accessible apparatus such as laser disc, opto-magnetic disc or hard disc, etc., it is possible to reproduce a recorded program at any point of the program with the key information 301 located in only one point. However, since, in such case, there may be an error produced on the recording medium, it is preferable to locate the key information 301 at at least two points.

The signal which is the compressed video data multiplexed with the key information and supplied from the output terminal 103 of the primary terminal portion 100 shown in FIG. 1A may be supplied to the input terminal 151 of the secondary terminal 150 shown in FIG. 1B directly or through the video signal recording/reproducing apparatus such as VTR. The compressed video data which is separated from the key information in the extractor circuit 161 and scrambled by the primary terminal portion 100 is descrambled by the descrambler 162. The decode key from the descrambler 162 is supplied to the switch 165. The terminal ID code of the primary terminal portion 100 supplied to one of the inputs of the comparator 164 is compared with the terminal ID code of the secondary terminal portion 150 stored in the memory 163 and supplied to the other input of the comparator 164. As mentioned previously, the terminal ID codes are different for the respective terminal pairs and the terminal ID codes for the paired primary and secondary terminal portions of each terminal are common. Therefore, it is possible to determine, by comparing the terminal ID code of the primary terminal portion with the terminal ID code of the secondary terminal terminal by means of the comparator 164, whether the compressed video data input to the input terminal 151 of the secondary terminal portion 150 is from the primary terminal portion 100 which is paired with the secondary terminal portion 150.

Only when the result of comparison performed in the comparator 164 and supplied to the switch 165 indicates that these two terminal ID codes are consistent, the switch 165 passes the key signal for decoding the compressed video signal, which is output from the descrambler 162, to the decode circuit 166.

The compressed video data separated from the key information by the separation circuit 161 input to the decoder circuit 166 is decoded in the decoder circuit 166 by using the decode key input thereto from the switch 165. When the comparison in the comparator 164 indicates an inconsistency between the two terminal ID codes, the decoding of the compressed video data is not performed in the decoder circuit 166 since the switch 165 does not output the decode key. That is, other compressed video data than that output from the primary terminal portion 100 paired with the secondary terminal portion 150 is not decoded in the decoder circuit 166.

The decoded video signal from the decoder circuit 166 is converted by the D/A converter 167 into an analog signal and displayed on the monitor 168, as mentioned previously. The video signal which is not decoded by the decoder circuit 166 can not be displayed correctly and therefore it can not be viewed.

Thus, by using the present system as the subscriber terminal for receiving the chargeable broadcasting, it is possible to immediately bill the receiving fee for the subscriber while preventing unauthorized reception of the same broadcasting.

Another embodiment of the primary terminal portion of the present invention will be described with reference to FIG. 4.

Figure 4:
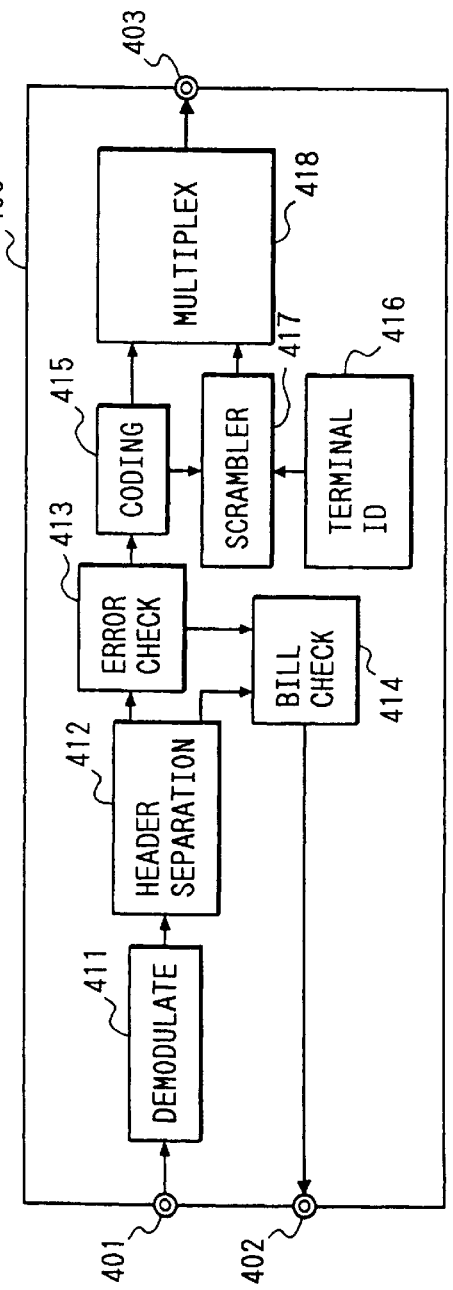
FIG. 4 is a block diagram of a primary terminal portion according to a second embodiment of the present invention.

In FIG. 4, a primary terminal portion 400 differs from the primary terminal 100 portion shown in FIG. 1A in that a coder circuit 415 is connected to the output of an error check circuit 413 corresponding to the error check circuit 113 in FIG. 1A and a scrambler 417 corresponding to the scrambler 116 in FIG. 1A is supplied with an output of the coder circuit 413 and an output of a terminal ID circuit 416 corresponding to the terminal ID circuit 115 in FIG. 1A. A secondary terminal portion to be paired with the primary terminal portion 400 may be one shown in FIG. 1B. Other constructional features are the same as that shown in FIG. 1A. That is, in FIG. 4, the primary terminal 400 includes an input terminal 401 for receiving the video signal from the relay transmitter 620, an output terminal 402 for outputting a billing information for the reception of the program at the primary terminal portion 400, an output terminal 403 for outputting a video signal scrambled in the primary terminal portion 400, a demodulator circuit 411 for digital-demodulating the video signal input at the input terminal 401, a separation circuit 412 for separating the key signal, etc., necessary to decode the data header containing the program information, etc., and the compressed video data from the digitally demodulated video signal by the demodulator circuit 411, the error checker 413 for confirming whether or not the video signal transmitted from the relay transmitter 620 is received correctly, a billing check circuit 414 for producing a billing information for the program reception fee on the basis of the program information separated by the separator circuit 412 and a result of the error check performed by the error checker 413, the coder circuit 415 for compressing and coding the received video signal, a memory 416 for storing an ID code specific to the terminal or a subscriber having the terminal, the scrambler 417 for scrambling the the key signal which is output from the coding circuit 415 and is necessary to code and multiplexing the scrambled code with the terminal identifying code and a multiplexer circuit 418 for time axis multiplexing the compressed video data output from the coding circuit 415 with the key information output from the scrambler 417.

The primary terminal portion 400 shown in FIG. 4 is effective in a case where the video signal transmitted from a relay terminal is not compressed or coded. It should be noted in this case that a program information and error check signals are necessary for billing subscribers. Such information may be inserted into time space specially provided therefor or into a vertical scan period.

The video signal transmitted from the relay transmitter 620 is input to the input terminal 401 of the primary terminal portion 400, the program information inserted into the vertical scan period, etc., is separated by the separation circuit 411 and supplied to the billing device 414 and the video signal is supplied to the error checker 413. The error checker 413 checks any error of the received video data and a result of check is supplied to the billing check circuit 414. The error check may be performed inserting a specific signal every horizontal scan period or vertical scan period, detecting a known specific signal by the error checker 413 and confirming an existence of the specific signal or inserting a parity into a horizontal scan period, etc.

In the billing check circuit 414, a billing information for the subscriber is produced in a similar manner to that in the first embodiment shown in FIG. 1A and is transmitted from the output terminal 402 to the relay transmitter 620. On the other hand, the video signal is supplied to the coding circuit 415 and coded by time-axis compression. Then, the compressed video data is supplied to the multiplexer circuit 418 and the key signal necessary for decoding the compressed video data is supplied to the scrambler 417. The scrambler 417 is supplied with the decode key from the coding circuit 415 and the terminal ID code from the memory 416. The decode key and the terminal ID code are multiplexed and scrambled by the scrambler 417. The terminal ID code used in this embodiment may be any used in the first embodiment. Further, in the multiplexer circuit 418, the key information from the scrambler 417 and, the compressed video data from the coding circuit 415 are time-axis multiplexed and output from the output terminal 403. Since the secondary terminal portion to be used together with the primary terminal portion 400 may be the same as that used in the first embodiment, its details are omitted.

With this embodiment of the primary terminal portion, it is possible to bill the subscriber and to prevent unauthorized reception of the program even when the video signal transmitted from the relay transmitter 620 is not coded by compression. Further, when the video signal from the relay transmitter is an analog signal, it can be processed properly by providing a tuner immediately before the demodulator circuit 411 and an A/D converter immediately after the demodulator circuit 411 or immediately before the coding circuit 415.

Another embodiment of the secondary terminal will be described with reference to FIG. 5.

Figure 5:
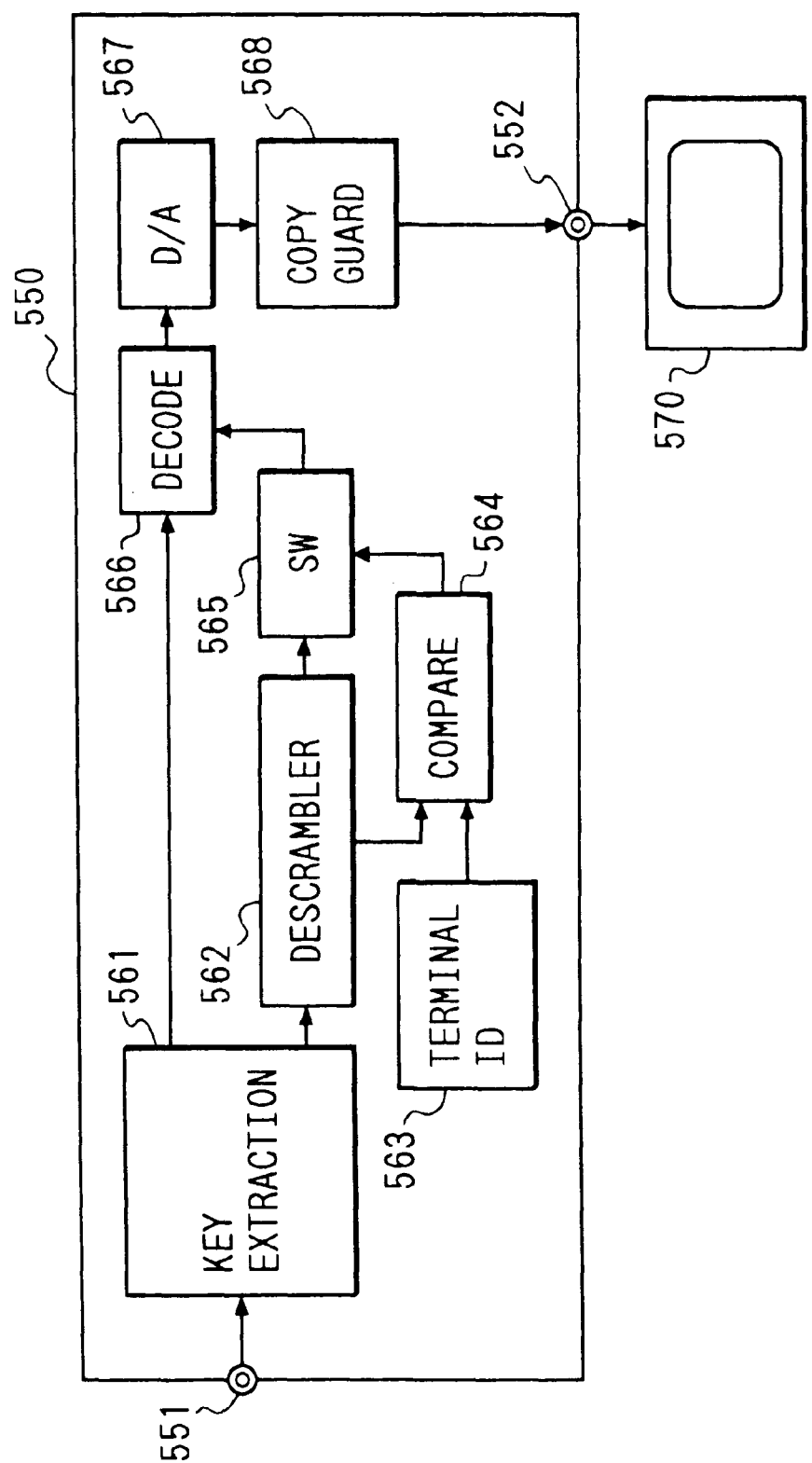
FIG. 5 is a block diagram of a secondary terminal portion according to a third embodiment of the present invention.

The secondary terminal portion 550 shown in FIG. 5 includes an input terminal 551 for receiving an output of an associated primary terminal portion, which may be one shown in FIG. 1A or the embodiment shown in FIG. 4, directly or a signal passed through a video signal recording/reproducing apparatus such as VTR, an output terminal 552 for outputting a decoded program video signal to a monitor 570, a key extraction circuit 561 for extracting the key information from the input video signal, a descrambler 562 for descrambling the key information extracted by the extraction circuit 561 and separating therefrom the decoding key and the terminal ID code, a memory 563 for preliminarily storing the terminal ID code, a comparator 564 for comparing the terminal ID code separated in the descrambler 562 with the terminal ID code stored in the memory 563, a switch 565 for receiving a decode key output from the descrambler 562 and allowing it to pass therethrough only when the comparator 564 decodes that the ID codes are consistent, a decode circuit 566 for decoding the compressed video signal by using the decode key from the switch 565, a D/A converter 567, a copy guard circuit 568 for processing the video signal from the D/A converter 567 such that it can not be recorded by the video signal recording/reproducing apparatus such as VTR and an external monitor 570 for displaying the program video output from the secondary terminal portion 550.

Since the components depicted by 561 to 567 correspond to the components 161 to 167 of the secondary terminal 150 shown in FIG. 1B, respectively, detailed descriptions thereof are omitted.

In FIG. 5, a signal which contains a compressed video data multiplexed with a key information and is output from the primary terminal portion such as shown in FIG. 1A or 4 is supplied to the input terminal 551 of the secondary terminal portion 550 directly or through a video signal recording/reproducing apparatus such as VTR. The input signal is processed through the extractor circuit 561, the descrambler 562, the memory 563, the comparator 564, the switch 565, the decoding circuit 566 and the D/A converter 567 in the same manner as performed through the components 161 to 167 in FIG. 1A to confirm the terminal ID code of the primary terminal portion, decode the compressed video data and convert it into an analog signal. The analog video signal output from the D/A converter 567 is supplied to the copy guard circuit 568 in which a synchronizing signal portion thereof is processed. That is, the secondary terminal portion 550 is associated with the monitor 570 for displaying the program video signal. The monitor 570 may be any of commercially available monitors and is provided externally. Therefore, a signal processing is necessary for preventing unauthorized reception of the video signal between the output terminal 552 and the monitor 570. In this embodiment, there is no need of recording the signal by the video signal recording/reproducing apparatus such as VTR. However, in the copy guard circuit 568, a signal processing for making the video signal possible to display on the monitor while preventing recording to the VTR is performed by changing the synchronizing portion of the video signal such that it is synchronized with the monitor but not synchronized with the VTR.

With the circuit construction of the secondary terminal portion of this embodiment, not only the same effect as that of the first embodiment is obtained, but also another effect that a conventional TV monitor can be used as the display device of the program video signal is obtained.

Figure 7:
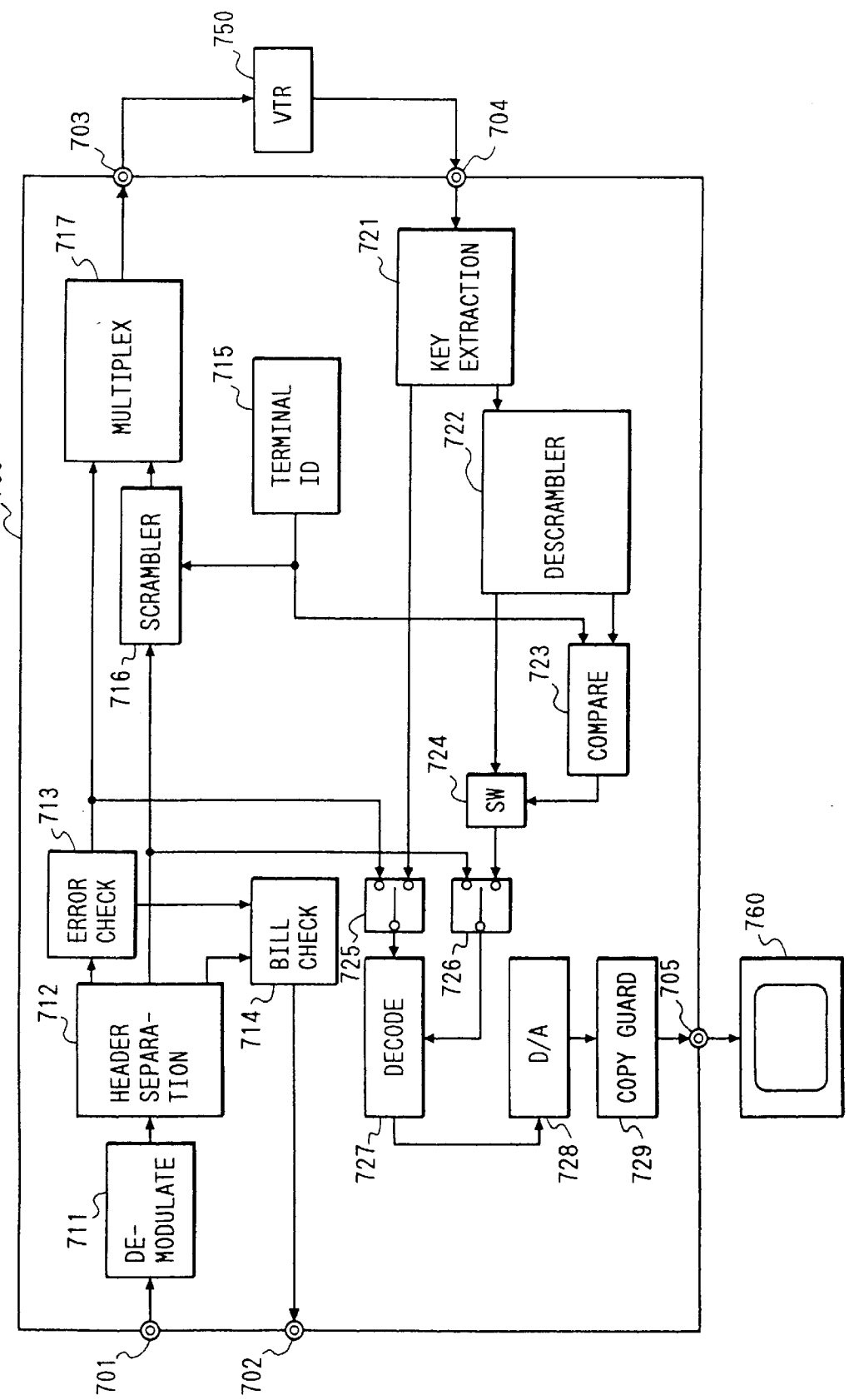
FIG. 7 is a block diagram of a video signal receiving terminal according to a fourth embodiment of the present invention.

FIG. 7 shows another embodiment of the terminal device in which the primary and secondary terminal portions are not separated.

In FIG. 7, the subscriber terminal 700 includes an input terminal 701 for receiving the video signal from the relay transmitter 620, an output terminal 702 for outputting a billing information for the reception of the program at the primary terminal 700, an output terminal 703 for outputting a scrambled video signal to a video signal recording/reproducing apparatus 750 such as VTR, an input terminal 704 for inputting the scrambled video signal from the video signal recording/reproducing apparatus 750, an output terminal 705 for outputting the program video signal to a display device 760 such as monitor, a demodulator circuit 711 for digital-demodulating the video signal input at the input terminal 701, a separation circuit 712 for separating the key signal, etc., necessary to decode the data header containing the program information, etc., and the compressed video data from the digitally demodulated video signal from the demodulator circuit 711, an error checker 713 for confirming whether or not the video signal transmitted from the relay transmitter is received correctly, a billing check circuit 714 for producing a billing information for the program reception fee on the basis of the program information separated by the separator circuit 712 and a result of the error check performed by the error checker 713, a memory 715 for storing an ID code specific to the subscriber terminal 700, a scrambler 716 for scrambling the the key signal separated by the separation circuit 712 and the terminal ID code stored in the memory 715 by multiplexing them, a multiplexer circuit 717 for time-axis multiplexing the compressed video data output from the error checker 713 with the key information output from the scrambler 716, an extraction circuit 721 for extracting the key information from the video signal input from the input terminal 704, a descrambler 722 for descrambling the key information extracted by the extraction circuit 721 and separating therefrom the decoding key and the terminal ID code, a comparator 723 for comparing the terminal ID code separated in the descrambler 722 with the terminal ID code stored in the memory 715, a switch 724 for receiving a decode key output from the descrambler 722 and allowing the key to add through only when an output of the comparator 723 indicates that the keys are consistent, a first selector 725 for selecting one of the compressed video data from the error checker 713 and the compressed video data from the extractor circuit 721, a second selector 726 for selecting one of the decode key from the separation circuit 712 and the decode key from the switch 724, a decode circuit 727 for decoding the compressed video signal from the first selector 725 by using the decode key from the second selector 726, a D/A converter 728, a copy guard circuit 729 for processing the video signal from the output terminal 705 such that it can not be recorded by a video signal recording/reproducing apparatus 750 such as VTR, optomagnetic disc, hard disc, etc., capable of recording a video signal and a monitor 760 for displaying the program video output from the terminal 700. Since the components depicted by 711 to 717 correspond to the components 111 to 117 shown in FIG. 1A, respectively, and the components depicted by 721 to 724 and 727 to 729 correspond to those depicted by 561, 562 and 564 to 568 in FIG. 5, respectively.

In FIG. 7, the video signal transmitted from the relay transmitter 620 shown in FIG. 6 is received at the input terminal 701 of the terminal 700 and passed through the demodulator circuit 711, the separation circuit 712, the error checker 713 and the billing check circuit 714 to digitally demodulate it, separate the program information and the decode key, confirm a transmission error and produce a billing information. These processings are similar to those performed in the corresponding circuits shown in FIG. 1A and FIG. 1B, details thereof are omitted.

The compressed video data output from the error checker 713 is supplied to the multiplexer circuit 717 and the first selector 725 and the decode key output from the separation circuit 712 is supplied to the scrambler 716 and the second selector 726.

The decode key supplied to the scrambler 716 is multiplexed with the terminal ID number stored in the memory 715 and then time-axis multiplied with the compressed video data supplied to the multiplexer 717. Since the processing performed by the scrambler 716 and the multiplexer 717 is the same as that performed in the first embodiment, detailed description thereof is omitted. The above mentioned compressed video data multiplexed with the decode information is output from the output terminal 703 to the video signal VTR 750 in which the video signal can be recorded and saved on the recording medium.

The signal reproduced by the VTR 750 is supplied to the input terminal 704 and, then, to the extractor circuit 721 in which the key information is separated from the compressed video data. The key information is supplied to the descrambler 722 and the compressed video data is supplied to the first selector 725. The key information is descrambled by the descrambler 722 as in the same manner as that described with respect to FIG. 5 and, then, it is separated to the decode key and the terminal ID code. The terminal ID code is compared with the content of the memory 715 by the comparator 723. On the other hand, the decode key is supplied to the switch 724 the output of which is controlled by the result of comparison in the comparator 723 and supplied to the second selector 726.

The first selector 725 and the second selector 726 always cooperate. That is, when the first selector 725 selects and outputs the output of the error checker 713, the second selector 726 selects and outputs the decode key from the separation circuit 712, or vice versa. That is, when a certain external VTR is connected to the terminal 700 and the video signal data is input from the input terminal 704, the selectors 725 and 726 operate to select the compressed video data reproduced by the VTR and the decode key and, otherwise, they operate to select the compressed video data from the error checker 713 and the decode key from the separation circuit 712.

The compressed video data output from the first selector 725 is decoded by the decoder circuit 727 with using the decode key from the second selector 726. Further, the data is processed by the D/A converter 728 and the copy guard circuit 729 in the same manner as that mentioned with respect to FIG. 5.

With the terminal having constructed as mentioned above, the same effect as those obtained by any of the previously described embodiments is obtained. Further, according to this embodiment, only one memory for storing the terminal identifying code is required in the terminal.

In addition, since, in this embodiment, the terminal is not physically separated to the primary and secondary terminals, space economy is improved. Further, there is no need of wiring which is required between the primary and secondary terminals.

Although these embodiments have been described for the case where the program is transmitted from the relay transmitter through the wire communication, the present invention can be applied to other transmission medium such as telephone line, ground wave broadcasting or satellite broadcasting, regardless of transmission system, analog or digital.

Further, the data structure of the video signal shown in FIG. 2 is a mere example and other format may be used. Although the data header portion representing the program information and the parity portion are required for the video signal transmitted from the relay transmitter, the parity portion may be omitted if the transmission line is error-free. Further, concentrating to only the prevention of unauthorized reception of program without considering the billing, the present invention can be applied to the signal construction of the current broadcasting. Further, the data structure for the data transferred between the primary and secondary terminals may be any provided that the key information is suitably inserted in the compressed video data. Further, the video data to be transferred between the primary and secondary terminal portions is not always necessary to be compressed data. When not compressed, there may be necessary to scramble the video data in some other way than compression.

According to the present invention, it is possible to confirm in the receiving terminal that a program is transmitted correctly from the program producing company and, when there is any error occurred in the transmission data, it is possible to request for the company a re-transmission thereof. When the program is received by the receiving terminal correctly, the company can bill, without any delay, the terminal or the subscriber according to the program name, the company name, the copyright owner and/or receiving time.

Further, by scrambling the signal received after billing, it is possible to prevent the dubbing of the program by means of a VTR and the unauthorized receiving of the program to thereby protect the program producer and/or the copyright owner against infringement.

Figure 8:
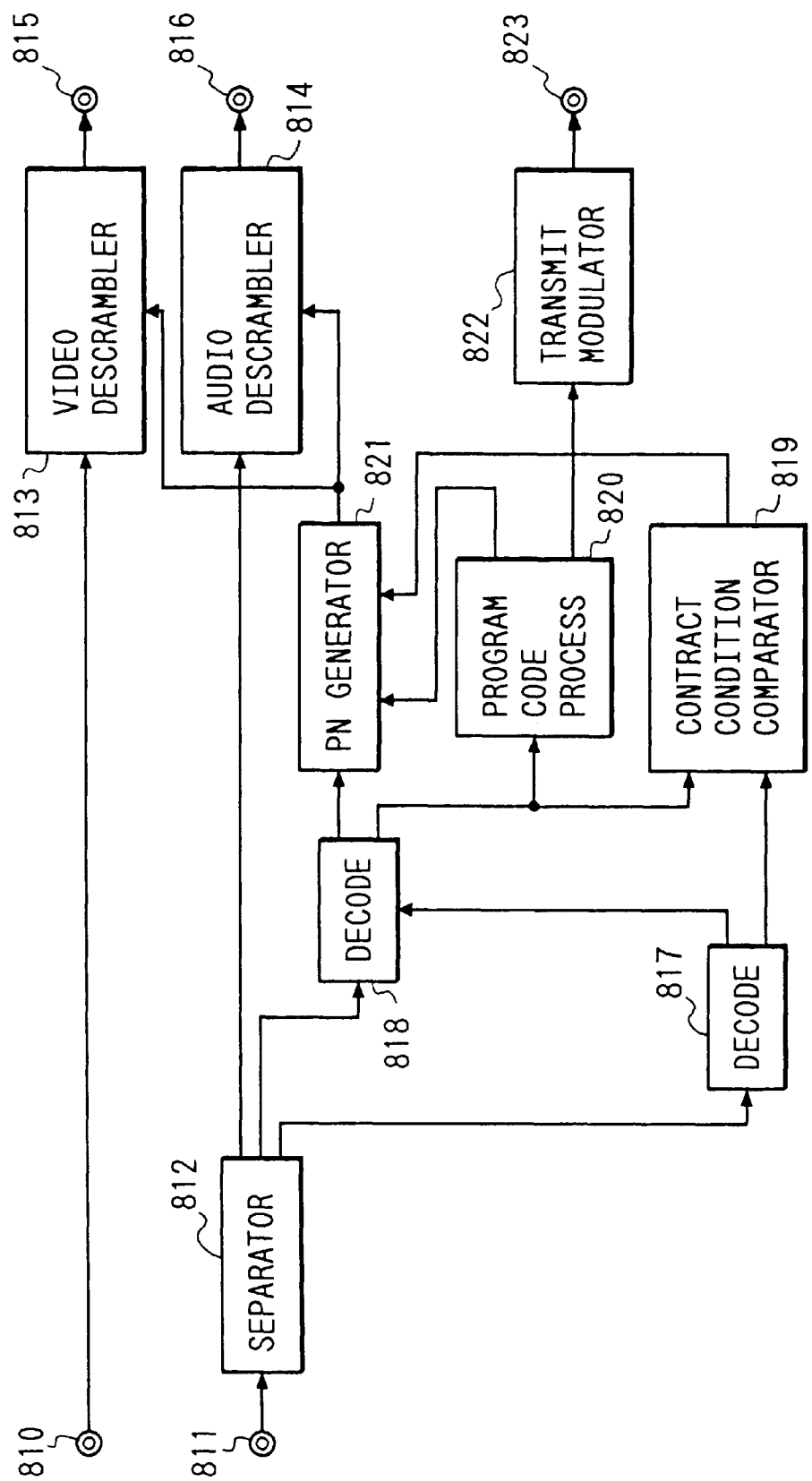
FIG. 8 is a block diagram showing a fifth embodiment of the present invention.

FIG. 8 is a block diagram of another embodiment of the present invention. This embodiment includes a video signal input terminal 810, a PCM audio signal input terminal 811, a separator circuit 812, a video signal descrambler 813, an audio signal descrambler 814, a video data output terminal 815, an audio signal output terminal 816, decoders 817 and 818, a comparator 819 for comparing contract condition, a program code processing circuit 820, a PN generator 821, a data transmit modulator 822 and a transmitting output terminal 823.

This embodiment employs the previously mentioned PPP billing system for a broadcasting of the BS standard scrambling system.

As described in the previously mentioned Kobayashi's article, an analog video signal is switched every scan line at position based on the pseudo noise (PN) signal series generating logic with using a scramble key as an initial value according to the line rotation system to exchange time positions of signal components and a PCM audio signal is added with the PN signal series and multiplexed with a common information composed of a scramble key and an information indicating an attribute of a program and a discrete information composed of a work key and a content of discrete contract, and the video signal and the audio signal are transmitted together.

The information related to the program attribute is constructed with an ID information specific to a transmitter and an information related to date of broadcasting. In this embodiment, an ID information for discretely confirming respective programs is further added thereto. These information will be referred totally to as "program code" hereinafter.

The video signal and the PCM audio signal received and demodulated by a satellite broadcasting receiver are supplied to the input terminal 810 and the input terminal 811 of the signal processing system shown in FIG. 8, respectively. The video signal is then supplied to the video descrambler 813 and the PCM audio signal is supplied to the separator circuit 812 and separated thereby to the audio signal data, the common information and the discrete information. The audio signal data is supplied to the audio descrambler 814. The discrete information has been coded with a master key set in each signal processing system. The decoder 817 detects the work key and the discrete information by decoding a code of an information among the discrete information separated by the separator circuit 812, which is consistent with the master key thereof. The decoder 818 separates and detects the scramble key and the information indicating the attribute of the program including the program code by decoding the common information coded by the work key. The comparator 819 compares the detected information indicating the program attribute and the discrete information to confirm a consistence of conditions of the contract term of the subscriber and the transmitter. Upon the confirmation, the comparator 819 supplies a descramble permission to the PN generator 821.

The program code processing circuit 820 detects the program code from the decoder 818 and outputs a detection pulse of the program code to the PN generator 821. The program code processing circuit 820 includes a memory and compares a newly input program code with all program codes stored in the memory and, when the newly input program code is not consistent with any of the stored program codes, the new program code is output to the data transmit modulator 822 and written in the memory. This program code is saved in the memory until a specific time period from this time point lapses. When there is a program code in the memory which is consistent with the newly input program code, the new program code is neither written in the memory nor outputs the detection pulse and the program code.

The PN generator 821 corresponds in construction to the PN generator used in the program transmitter side for the scramble processing and sets the initial condition of the descramble processing using the scramble key detected by the decoder 818. The video descrambler 813 and the audio descrambler 814 perform processing inversely to those performed in the scrambling operations, on the basis of the control output of the PN generator 821. That is, the video signal is restored by specifying a combination of switching positions every scan line and re-switching these positions and the audio signal is restored by specifying the added PN signal series and removing the latter. The restored video data and the restored audio signal are output from the video data output terminal 815 and the audio data output terminal 816, respectively. The operation of the PN generator 821 is limited when the output of the comparator 819 indicates a consistence of the contract condition and the program code is detected by the program code processing circuit 820 and the descramblers 813 and 814 operate to descramble these data.

The data transmit modulator 822 detects the descramble permission from the comparator 819 and transmits the program code and the ID of the associated signal processing system from the transmitting output terminal 823 to the billing side.

The billing side detects the descrambled program from the received information and calculates the fee for program reception.

Since the program code of the program descrambled by the signal processing system is transmitted to the billing side and the same program is transmitted only once within the specifically set unit time even if the same program is viewed a plurality of times, the subscriber can view the same program a plurality of times within the specific time with a same fee.

Figure 9:
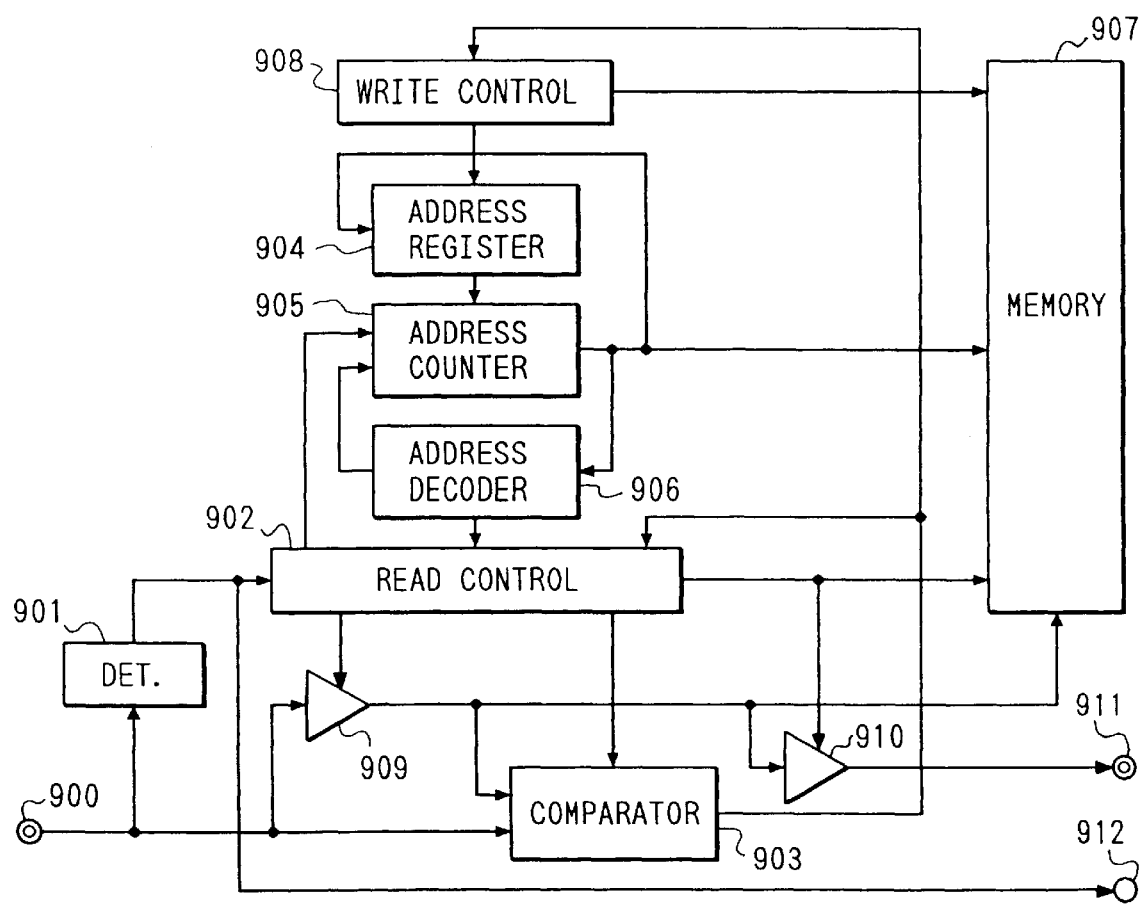
FIG. 9 is a block circuit diagram of a portion of the embodiment shown in FIG. 8.

FIG. 9 shows a construction of the program code processing circuit 820 in FIG. 8 in a case where the specific time unit is one day. The program code processing circuit 920 in FIG. 9 includes a program code input terminal 900 connected to the decoder 818 (FIG. 8), a program code detection circuit 901, a memory read control circuit 902, a comparator 903, an address register 904, an address counter 905, an address decoder 906, a memory 907, a memory write control circuit 208, buffers 909 and 910, a program code output terminal 911 connected to the transmit modulator 822 (FIG. 8) and a detection pulse output terminal 912 connected to the PN generator 821 (FIG. 8).

A program code is input to the buffer 909 and one input of the comparator 903 through the program code input terminal 900. When the program code is detected by the program code detection circuit 901, the latter outputs a detection pulse which is supplied to the memory read control circuit 902 which outputs a start pulse and supplied through the detection pulse output terminal 912 to the PN generator 821 (FIG. 8).

The address register 904 has stored a final address in which a previously input program code is written and the address counter 905 responds to the start pulse from the memory read control circuit 902 to decrement from this address until the address decoder 906 reports that a head address is reached to read all of the program codes stored in the memory 907 in sequence. The program codes thus read are compared with a newly input program code by the comparator 903 and, when there is a program code among the program codes thus read which is consistent with the new program code, the comparison is terminated at the time when the consistency is detected and the new program code is not written in the memory 907. When there is no program code which is consistent with the new program code, the new program code stored in the buffer 909 is output to the memory 907 under control of the memory write control circuit 908 to write it in the memory 907 and simultaneously supplied through the buffer 910 and the program code output terminal 911 to the data transmit modulator 822.

All of the program codes stored in the memory 907 and the last address in the address register 904 are cleared in one day period.

In the program code processing circuit shown in FIG. 9, the program code output is treated as one corresponding to one view even when the program is viewed any number of times within, for example, one day.

Although the program code processing circuit is provided in the signal processing system, the same can be performed on the billing side system. In such case, the program code processing circuit 820 (FIG. 8) is enough to have a function to send a detection pulse to the PN generator 821 and the data transmit modulator 822. The data transmit modulator 822 transmits all program codes for which descramble permission from the comparator 819 is detected together with the ID of the subscriber. The billing side bills as in the same manner as in the preceding embodiment by obtaining the descrambled program and its viewer from the received data. In addition, when the received data is saved for a specific time period, it is determined by comparing all program codes from a single viewer during this time period that the same data are received by the viewer several times, it is possible to stop a the billing to such multiple views of a single program.

The last embodiment is applicable to a VTR recording/reproducing signal, in which case, the same data as the video signal and PCM audio signal input to the decoder, that is, the scrambled program data, is recorded/reproduced at respective recording areas of the VTR. In this case, the common information such as scramble key and the discrete information are recorded in the PCM audio area without separating from the audio data. By demodulating the reproduced output from the VTR to the same format as that of the recording input and then inputting to the decoder, the output signal is subjected to the same program code processing subsequently in the same manner as the processing in viewing the received signal and the billing is performed in the same manner. In this case, there is an advantage that it is possible to view a single program a plurality of times with a fee equal to that for one view so long as the plural views are within a specific time.

Although, in this embodiment, the decoder corresponding to the BS standard scrambling system has been described, this invention is applicable to other scrambling systems. For example, it is possible to perform a scrambling by shuffling of digital data. In such case, the billing system can be applied by processing the program by the program code as in the described embodiment and adding the program code detection to the descramble permission condition of the descrambler, provided that the program code is included in the information such as descramble information transmitted together with the transmission data. Further, in this case, by using a DVTR using the same format for the input data to the decoder and the input/output data, the same billing system can be applied by descrambling the data which is obtained by demodulating a signal reproduced by DVTR through the decoder even for the CATV service in which the data is transmitted by compression as in the VOD.

Figure 10:
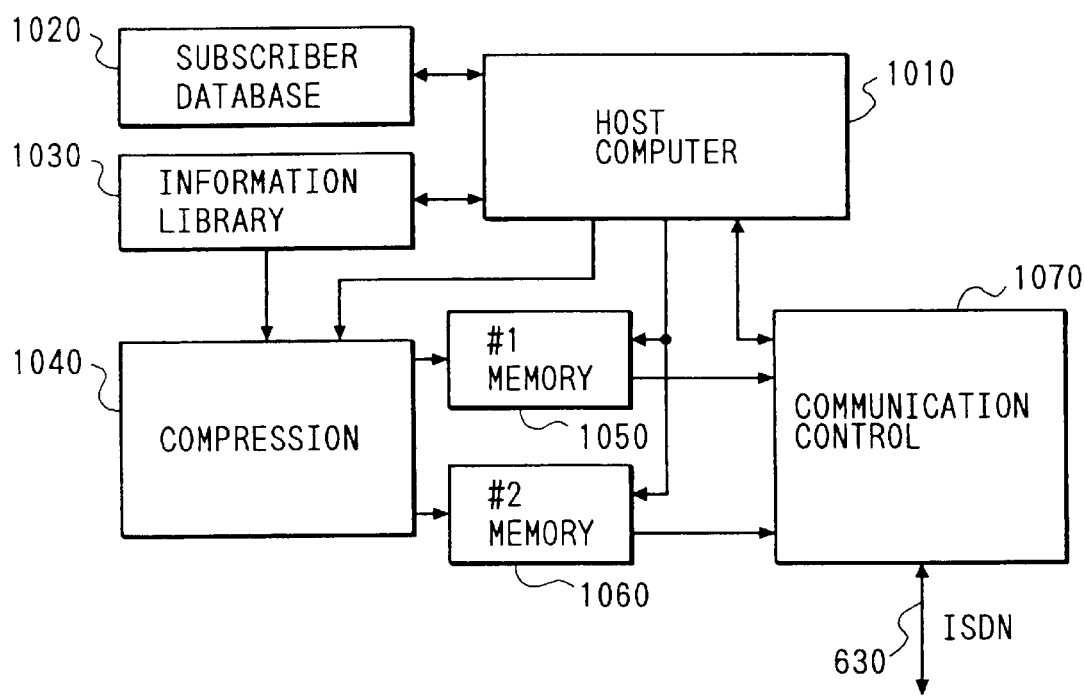
FIG. 10 is a block constructive diagram of an information transmitter of the interactive communication broadcasting system according to a sixth embodiment of the present invention.

FIG. 10 shows another embodiment of the present invention when applied to an information compression/transmission apparatus in the interactive communication broadcasting system. In FIG. 10, the information transmitter 620 (FIG. 6) includes a host computer 1010, a subscriber database 1020 for totally managing information related to the subscribers 641 to 643, an information library 1030 for storing and managing an information such as video information, audio information, character information, various data and/or application programs which can be requested by the subscribers, an information compression processor 1040 for compressing the information, a recording medium 1050 for storing first data output by the information compressing processor 1040, a recording medium 1060 for storing second data output by the information compressing processor 1040, a communication control device 1070 for performing an interactive communication and the digital communication line 630.

FIG. 11 shows data formats used in the interactive communication between the information transmitter 620 and the subscriber terminals 641 to 643 (FIG. 6). In FIG. 11, the formats include an information list request signal 1101 transmitted from the subscriber terminals to the information transmitter 620, an information list data 1102 transmitted from the information transmitter 620 to the subscriber terminals, a first request 1103 transmitted from the subscriber terminals to the information transmitter 620, a first data 1104 which is a compressed data to be transmitted from the information transmitter 620 to the subscriber terminals, a second request 1105 requesting an attribute information from the subscriber terminals to the information transmitter 620, a second data 1106 which is the attribute information transmitted from the information transmitter to the subscriber terminals and a data 1107 transmitted from the information transmitter to the subscriber terminals for billing the banking system terminal 644.

In each data format shown in FIG. 11, a start-of-data (ST) and an end-of-data (EOD) are attached by the communication controller 1070 (FIG. 10) at a head and an end of the format, respectively. Further, a time-code (TC) is attached at a head of each compressed data.

In the information transmitter 620, the communication controller 1070, when receives the information list request signal 1101 from any of the subscriber terminals through the digital communication line 630, extracts the ID number of the subscriber terminal from the received data and reports to the host computer 1010 that there is an information list request 1101 from the subscriber terminal. The host computer 1010 references the subscriber database 1020 according to the ID number from the communication controller 1070 to check the subscriber's conditions of line utilization and nonpayment to the banking system, etc., and determine whether or not the requested information is to be sent to the subscriber terminal.

In requesting the information list, the subscriber terminal can assign a selecting condition of information. In such case, the communication controller 1070 extracts the selecting condition of information from the received data containing the information list request and reports it to the host computer 1010. The host computer 1010 searches the information library 1030 according to the selecting condition, produce a list of currently available information and sends it to the information compressing processor 1040 together with the conditions of the subscriber terminal. The data of the information list which is compressed by the information compressing processor 1040 is stored in the first memory 1050 and the attribute information necessary for decompressing the information in the subscriber terminal is stored in the second memory 1060. The data stored in the first and second memories 1050 and 1060 are sent through the communication controller 1070 and the digital communication line 630 to the subscriber terminal under permission of the host computer 1010. The subscriber terminal which receives the information list data 1102 decompresses the compressed data and selects the information and, then, requests the information transmitter 620 to send the selected information.

The information list request 1101 from the subscriber terminal to the information transmitter is not always made every transmission request of information. For example, the request can be made at a time of information search or regularly, for example, once a month.

When the communication controller 1070 responds to a reception of the first request 1103 from the subscriber terminal through the digital communication line 630 to extract conditions of the subscriber terminal such as the ID number, a management number of information requested to be transmitted and a valid term of information, etc., from the received data and reports them to the host computer 1010. The host computer 1010 references the subscriber database 1020 according to the subscriber's ID number received from the communication controller 1070 to check the subscriber's conditions of line utilization and nonpayment to the banking system, etc., and determine whether or not the requested information is to be sent to the subscriber terminal. When it is determined that the requested information can be sent to the subscriber terminal, the host computer 1010 searches the information library 1030 according to the management number of the requested information to check whether or not the requested information can be available for the subscriber terminal. If it is available for the subscriber, the requested information is transferred from the information library 1030 to the information compressing processor 1040.

The information compressing processor 1040 compresses the information transferred from the information library 1030 and the compressed data is stored in the first memory 1050. Upon a permission of transmission from the host computer 1010, the data stored in the first memory 1050 is transferred to the data communication controller 1070 from which the first data 1104 which is the compressed data is transmitted through the digital communication line 630 to the subscriber terminal. since, in general, an amount of data of the first data 1104 transmitted upon the first request 1103 is substantial and there is an upper limit of an amount of information transmitted in unit time through the digital communication line 630, it takes a certain time necessary to transmit the first data 1104 upon the first request 1103.

On the other hand, since an amount of data of the second data 1106 which is the attribute information stored in the second memory 1060 and is necessary to decompress the information in the subscriber terminal is small compared with that of the compressed first data 1104, it can be transmitted within a negligibly short time.

In the subscriber terminal, the first data 1104 transmitted according to the first request 1103 is recorded in, for example, an optomagnetic disc device. In order to decompress and reproduce the first data 1104, the subscriber terminal sends the second request 1105 through the digital communication line 630 to the communication controller 1070 of the information transmitter 620 to request a transmission of the attribute information necessary to decompress the data.

The communication controller 1070, when receives the second request 1104 requesting the transmission of information from the subscriber terminal through the digital communication line, extracts the ID number of the subscriber terminal and the management number of the requested information from the received data and reports it to the host computer 1010. The host computer 1010 references the subscriber database 1020 according to the ID number to check the subscriber's conditions of line utilization and nonpayment to the banking system, etc., and determine whether or not the requested information is to be sent to the subscriber terminal. When it is determined that the request is acceptable, the host computer 1010 issues a transmission permission to the second memory 1060 and transfers the second data 1106 stored in the memory 1060 to the communication controller 1070. The communication controller 1070 transmits the attribute information through the digital communication line 630 to the subscriber terminal.

The second data 1106 transmitted in response to the second request 1105 is stored in the memory of the subscriber terminal. The compressed data 1104 received in response to the first request 1103 is decompressed by using the attribute information of the second data 1106.

When the transmission of the second data 1106 from the information transmitter 620 to the subscriber terminal is completed, the host computer 1010 of the transmitter 620 updates the management information of the subscriber database 1020. Then, the transmitter 620 transmits a billing information 1107 to the banking system terminal 644 to bill the latter for the fee of the subscriber.

An operation of the information compressing processor 1040 will be described with reference to FIG. 12 which is a block diagram of the processor 1040. In order to most efficiently compress the information, it is necessary to select a compression method most suitable for a characteristics of each of data to be compressed. Therefore, although not shown in FIG. 12, a circuit for determining the kind of information at a time of the input of information, compression circuits suitable for the respective information and a selector circuit for switching the compression circuits according to the information are provided in the information compressing processor 1040.

The operation will be described assuming the video signal as an example of the information to be compressed.

Figure 12:
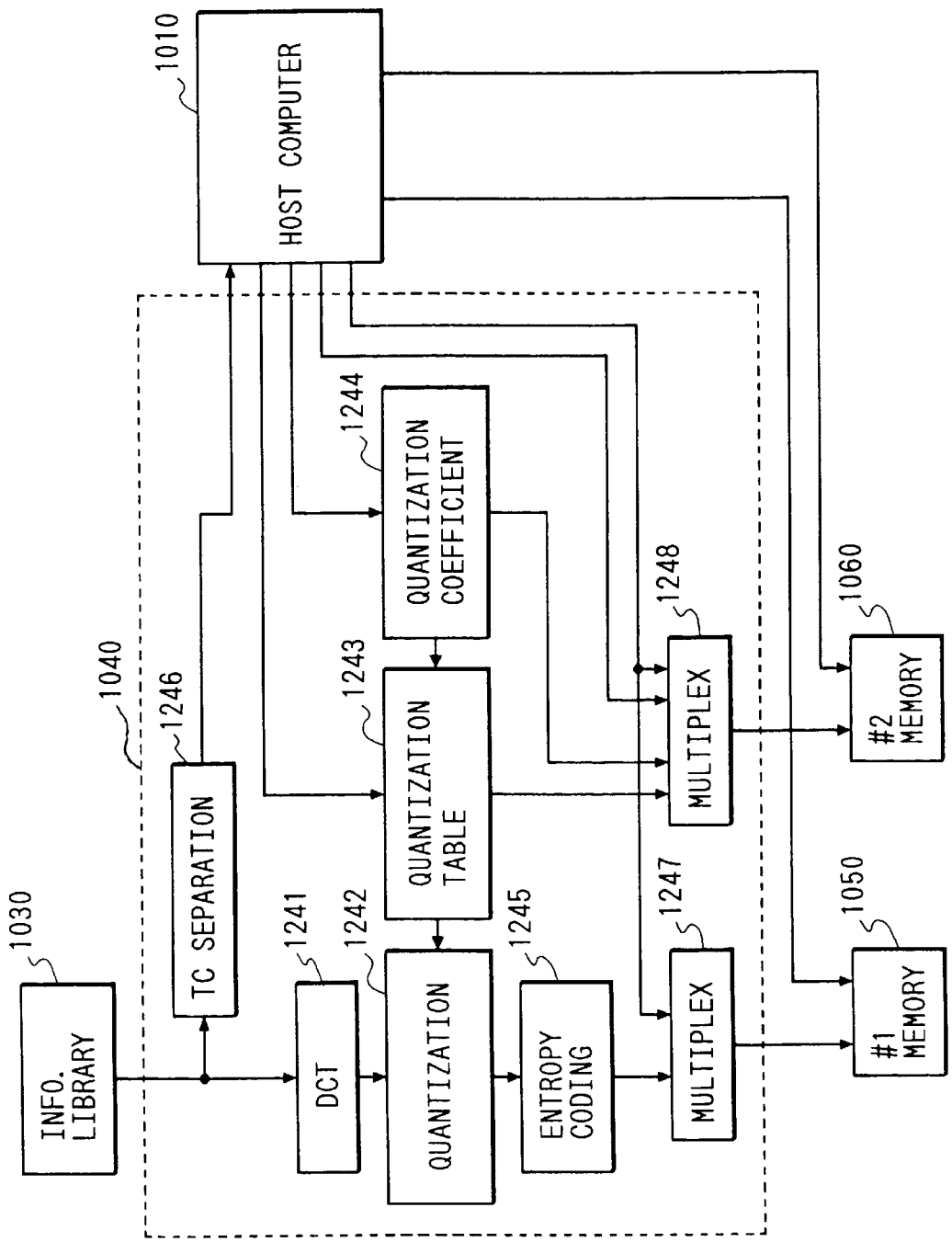
FIG. 12 is a block diagram of an internal construction of the information compressing/transmitting apparatus shown in FIG. 10.

In FIG. 12, the information compressing processor 1040 includes a discrete-cosine-transform (DCT) circuit 1241, a quantizer 1242, a quantization table setting circuit 1243, a scale factor setting circuit 1244, an entropy coding circuit 1245, a time code separator circuit 1246, a first multiplexer circuit 1247 and a second multiplexer circuit 1248.

The host computer 1010 received the first request 1103 from the subscriber terminal assigns the information requested by the subscriber terminal to the information library 1030. The information library 1030 responds thereto to start a data transfer of the assigned information to the information compressing processor 1040. The video signal input to the information compressing processor 1040 is divided to blocks each 8×8 pixels and is frequency-converted by the DCT circuit 1241 every block. The video signal input to the DCT circuit 1241 is a digital signal. Therefore, when the video signal input to the information compressing processor 1040 is an analog signal, it is necessary to convert it into a digital signal by means of a A/D converter, not shown, before it is input to the DCT circuit 1241.

In general, the input video signal contains a time code for editing it during a vertical synchronizing period and a user's bit information. The time code separator circuit 1246 separates the time code and the user's bit from the input video signal and supplies them to the host computer 1010. The host computer 1010 changes the scale factor and the quantization table periodically or in irregular time interval produced by generating random number, while referencing the time code and the user's bit by setting the quantization table and the scale factor in the quantization table setting circuit 1243 and the scale factor setting circuit 1244 sequentially, respectively. The quantizer circuit 1242 quantizes the DCT coefficient according to these settings. And, the quantized DCT coefficient is variable-length coded by the entropy coding circuit 1245 to compress the video signal. The compressed video signal is attached by the multiplexer circuit 1247 with an ID number issued by the host computer 1010 and stored in the first memory 1050. This data becomes the first data 1104. The attribute information of the scale factor, the quantization table and the time code, which is necessary for decompression of the compressed data, is attached by the multiplexer circuit 1248 with the same ID number as that attached to the first data 1104 and stored in the second memory 1060. This data is the second data 1106.

A correspondence between the first data 1104, the compressed data, and the second data 1106, the attribute information, which are transferred separately in time, must be fixed. In order to realize this, the host computer 1010 assigns the same ID number to both of them. The second request 1105 which is issued when the subscriber terminal decompresses and reproduces the information is attached with the ID number extracted from the first data 1104, upon which the second data 1106 stored in the second memory 1060 is transmitted.

In the subscriber terminal, the correspondence between the compressed data and the attribute information is established by means of the common ID number and thus it is possible to decompress and reproduce the compressed data. Further, in order to decompress and reproduce the compressed data received by the subscriber terminal, an attribute information related to the scale factor and the quantization table synchronized with the time code is necessary since the transferred compressed data is in a state as if it is scrambled.

When the subscriber terminal is designed such that it can not record the attribute information received thereby in a non-volatile recording medium such as an optomagnetic disc, it is possible to bill for the subscriber by counting the number of requests for the attribute information.

Figure 13:
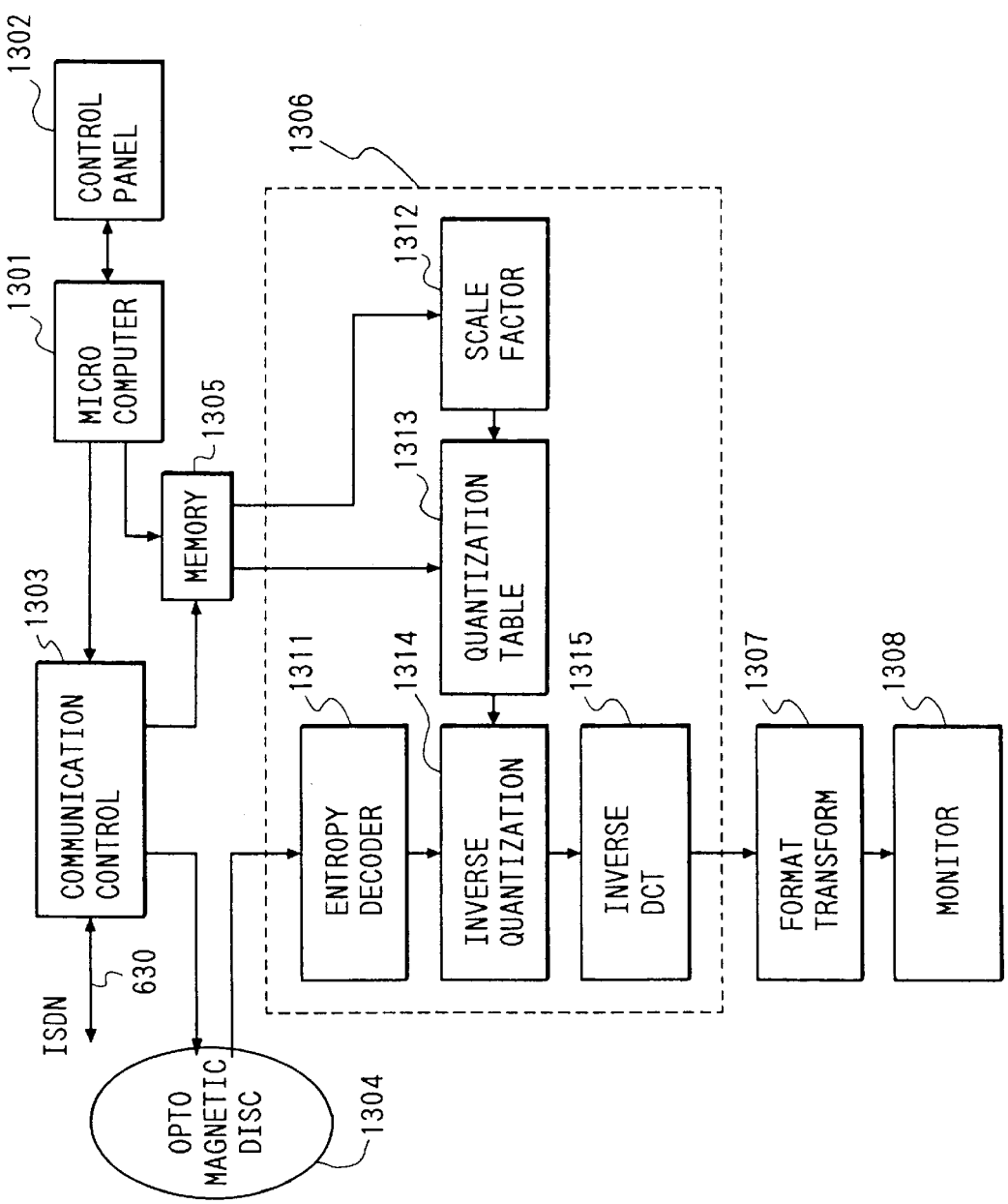
FIG. 13 is a block diagram of an internal construction of another embodiment of the information compressing/transmitting apparatus shown in FIG. 10.

FIG. 13 is a block diagram of an internal construction of another embodiment of the subscriber terminal 641 to 643. The subscriber terminal includes a micro computer 1301, a control panel 1302, a communication controller 1303, an optomagnetic disc 1304, a memory 1305, a decompression processor 1306, a format transform circuit 1307 and a monitor 1308. The decompression processor 1306 includes an entropy decoder circuit 1311, a scale factor setting circuit 1312, a quantization table setting circuit 1313, an inverse-quantizer circuit 1314 and an inverse-DCT circuit 1315.

The control panel 1302 functions to control all of operations of the subscriber terminals related to human interface and is capable of operating and displaying the information request 1101, the information search and selection, the first request 1103, the second request 1105 and decompression and reproduction.

The micro computer 1301 controls the whole subscriber terminals. The first data 1104 and the second data 1106 received through the ISDN communication line 630 are identified in the communication control circuit 1303 under control of the micro computer. The first data 1104 is recorded on the optomagnetic disc 1304. The optomagnetic disc 1304 may be housed in the subscriber terminal or detachable with respect to the subscriber terminal. On the other hand, the second data 1106 is stored in the memory 1305 provided in the subscriber terminal in such manner that the content of the memory 1305 can not be derived externally of the terminal.

When the micro computer 1301 receives a command from the control panel 1302 for decompression and reproduction, it instructs the communication control circuit 1303 and the memory 1305 to read out the data from the optomagnetic disc 1304 and the memory 1305 and to start the decompression in the decompression processor circuit 1306. The first data 1104, the compressed data, reproduced from the optomagnetic disc 1304 is decoded by the entropy decoder circuit 1311. On the other hand, the scale factor read out from the memory 1305 is set in the scale factor setting circuit 1312 and the quantization table read out from the memory 1305 is set in the quantization table setting circuit 1313. The decoded, compressed data is inverse-quantized by the inverse-quantizer 1314 according to a value of the quantization table set in the quantization table setting circuit 1313 and a value of the scale factor set in the scale factor setting circuit 1312 and, then, decompressed by the inverse DCT circuit 1315. The micro computer 1301 confirms a consistence between the ID numbers stored in the optomagnetic disc 1304 and the memory 1305 and controls an output from the memory 1305 to sequentially set the quantization table setting circuit 1313 and the scale factor setting circuit 1312.

The decompressed video signal is attached with a sync signal by the format transform circuit 1307, converted into the analog signal by the D/A converter if necessary and displayed on the monitor 1308.

Thus, by preliminarily receiving and recording the first data 1104 in the subscriber terminal, it is possible to decompress and reproduce by receiving the second data within a negligible, very short time.

Although the embodiment was described by taking the construction including a dedicated hardware for decompressing the compressed data as an example, it is possible to perform the operation of the compression processor 1306 by a software of the micro computer 1301.

Further, although the ISDN or CATV is used as the digital communication line, other communication line such as optical communication network, a modem using an analog telephone line or a local area network may be used.

The optomagnetic disc used as the recording medium for recording the compressed data may be substituted by a digital signal recording/reproducing apparatus such as digital VTR, digital audio tape recorder, optical disc device or hard disc device.

According to the present invention, an information requested by a subscriber terminal is compressed and the compressed information is divided to a compressed data and its attribute information. A common ID number is attached to the compressed data and the attribute information and the latter two are transmitted to the subscriber terminal separately in time. In the subscriber terminal side, the compressed data received can not be decompressed without the attribute information. Further, when the subscriber terminal is constructed such that the attribute information can not be recorded on a non-volatile recording medium, a copyright of the information is protected and it is possible to bill the subscriber according the number of times he requests the attribute information.

On the other hand, when the compressed data is preliminarily received and recorded on the side of the subscriber terminal, it is possible to decompress and reproduce the received and recorded compressed data by receiving only the attribute information within a very short time.

What is claimed is:

1. A data receiver terminal for receiving scrambled data supplied from an information supplier comprising:
   a multiplexing circuit for multiplexing said scrambled data and an identification code identifying said data receiver terminal or a user;
   a data recording/reproducing apparatus for being able to record and reproduce a multiplexed data output from said multiplexing circuit;
   an extracting circuit for extracting said identification code from said multiplexed data reproduced from said data recording/reproducing apparatus;
   a comparator for comparing said identification code extracted by said extracting circuit with said identification code provided by said multiplexed circuit;
   a descrambling circuit for descrambling said scrambled data of said multiplexed data reproduced from said data recording/reproducing apparatus; and,
   wherein said descrambling circuit descrambles said scrambled data of said multiplexed data only when the descrambling of said scrambled data is permitted according to a result of a comparison performed by said comparator.

2. The data receiver terminal claimed in claim 1, wherein said scrambled data includes at least one error detecting code, and
said data receiver terminal provides an error check circuit which confirms a correction of said received scrambled data referring to said error detecting code and requests a retransmission of said scrambled data to said information supplier when said error check circuit confirms a transmission error of said received scrambled data.

3. A data receiver terminal claimed in claim 1, wherein said scrambled data includes at least compressed video data and program information having a different value for each said compressed video data for identifying said compressed video data; and said data receiver terminal further provides a program information processing circuit for distinguishing said program information included in said scrambled data and a transmitter for transmitting data to said information supplier, and transmits at least said program information identified by the program information processing circuit and said identification code identifying said data receiver terminal or said user to said information supplier.

4. The data receiver terminal claimed in claim 3, wherein said data receiver terminal is billed a receiving charge for receiving said scrambled data supplied from said information supplier at least on the basis of said program information and said identification code transmitted from said transmitted to said supplier.

5. The data receiver terminal claimed in claim 3, wherein said data receiver terminal is billed only once a receiving charge for receiving said scrambled data supplied from said information supplier at least on the basis of said program information and said identification code transmitted from said transmitter to said information supplier, when said scrambled data is newly descrambled a plurality of times within a specific period by said descrambling circuit.

6. A data receiver terminal for receiving scrambled data supplied from an information supplier comprising:

a multiplexing circuit for multiplexing said scrambled data and an identification code identifying said data receiver terminal or a user;

an output terminal for outputting a multiplexed data output from said multiplexing circuit;

an input terminal for inputting said multiplexed data;

an extracting circuit for extracting said identification code from said multiplexed data input from said input terminal;

a comparator for comparing said identification code extracted by said extracting circuit with said identification code provided by said multiplexed circuit;

a descrambling circuit for descrambling said scrambled data of said multiplexed data input from said input terminal; and wherein said descrambling circuit descrambles said scrambled data of said multiplexed data only when the descrambling of said scrambled data is permitted according to a result of a comparison performed by said comparator.

7. The data receiver terminal claimed in claim 6; wherein said scrambled data includes at least one error detecting code, and said data receiver terminal provides an error check circuit which confirms a correction of said received scrambled data referring to said error detecting code and requests a retransmission of said scrambled data to said information supplier when said error check circuit confirms a transmission error of said received scrambled data.

8. The data receiver terminal in claim 6, wherein said scrambled data includes at least compressed video data and program information having a different value for each said compressed video data for identifying said compressed video data; and said data receiver terminal further provides a program information processing circuit for distinguishing said program information included in said scrambled data and a transmitter for transmitting data to said information supplier, and transmits at least said program information identified by the program information processing circuit and said identification code identifying said receiver terminal or said user to said information supplier.

9. The data receiver terminal claimed in claim 8, wherein said data receiver terminal is billed a receiving charge for receiving said scrambled data supplied from said information supplier at least on the basis of said program information and said identification code transmitted from said transmitter to said information supplier.

10. The data receiver terminal claimed in claim 8, wherein said data receiver terminal is billed only once a receiving charge for receiving said scrambled data supplied from said information supplier at least on the basis of said program information and said identification code transmitted from said transmitter to said information supplier, when said scrambled data is newly descrambled a plurality of times within a specific period by said descrambling circuit.

11. A data receiver terminal for receiving scrambled data supplied from an information supplier comprising:

a multiplexing circuit for multiplexing said scrambled data and an identification code identifying said data receiver terminal or a user;

an input/output terminal for proceeding suitably interchangeably to input a multiplexed data of scrambled data and an identification code, and to output a multiplexed data output from said multiplexing;

an extracting circuit for extracting said identification code from said multiplexed data input from said input/output terminal;

a comparator for comparing said identification code extracted by said extracting circuit with said input/output terminal;

a comparator for comparing said identification code extracted by said extracting circuit with said identification code provided by said multiplexing circuit;

a descrambling circuit for descrambling said scrambled data of said multiplexed data input from said input/output terminal; and, wherein said descrambling circuit descrambles said scrambled data of said multiplexed data only when the descrambling of said scrambled data is permitted according to a result of a comparison performed by said comparator.

12. The data receiver terminal claimed in claim 11, wherein said scrambled data includes at least one error detecting code, and said data receiver terminal provides an error check circuit which confirms a correction of said received scrambled data with referring to said error detecting code and requests a retransmission of said scrambled data to said information supplier when said error check circuit confirms a transmission error of said received scrambled data.

13. The data receiver terminal claimed in claim 11, wherein said scrambled data includes at least compressed video data and program information having a different value for each said compressed video data for identifying said compressed video data; and, said data receiver terminal further provides a program information processing circuit for distinguishing said program information included in said scrambled data and a transmitter for transmitting data to said supplier, and transmits at least said program information identified by the program information processing circuit and said identification code identifying said data receiver terminal or said user to said information supplier.

14. The data receiver terminal claimed in claim 13, where said data receiver terminal is billed only once a receiving charge for receiving said scrambled data supplied from said information supplier at least on the basis of said program information and said identification code transmitted from said transmitter to said information supplier, when said scrambled data is newly descrambled a plurality of times within a specific period by said descrambling circuit.

15. The data receiver terminal claimed in claim 13, wherein said data receiver terminal is billed a receiving charge for receiving said scrambled data supplied from said information supplier at least on the basis of said program information and said identification code transmitted from said transmitter to said information supplier.

16. A data receiver terminal for receiving scrambled data supplied from an information supplier comprising:
    a first output terminal for outputting said scrambled data supplied from said information supplier; a second output terminal for outputting an identification code identifying said data receiver terminal or a user;
    a first input terminal for inputting said scrambled data;
    a second input terminal for inputting said identification code identifying said data receiver terminal or a user;
    a comparator for comparing said identification code input from said second input terminal with said identification code output from said output terminal;
    a descrambling circuit for descrambling said scrambled data input from said first input terminal; and
    wherein said descrambling circuit descrambles said scrambled data input from said first input terminal only when the descrambling of said scrambled data is permitted according to a result of a comparison performed by said comparator.

17. The data receiver terminal claimed in claim 16, wherein
    said scrambled data includes at least one error detecting code, and said data receiver terminal provides an error check circuit which confirms a correction of said received scrambled data which referring said error detecting code and requests a retransmission of said scrambled data to said information supplier when said error check circuit confirms a transmission error of said received scrambled data.

18. The data receiver terminal claimed in claim 16, wherein
    said scrambled data includes at least compressed video data and program information having a different value for each said compressed video data for identifying said compressed video data; and
    said data receiver terminal further provides a program information processing circuit for disthinguishing said program information included in said scrambled data and a transmitter for transmitting data to said information supplier, and transmits at least said program information identified by the program information processing circuit and said identification code identifying said data receiver terminal or said user to said information supplier.

19. The data receiver terminal claimed in claim 18, wherein said data receiver terminal is billed only once a receiving charge for receiving said scrambled data supplied from said information supplier at least on the basis of said information and said identification code transmitted from said transmitter to said information supplier, when said scrambled data is newly descrambled a plurality of times within a specific period by said descrambling circuit.

20. The data receiver terminal claimed in claim 18, wherein said data receiver terminal is billed a receiving charge for receiving said scrambled data supplied from said information supplier at least on the basis of said program information and said identification code transmitted from said transmitter to said information supplier.

21. A data receiver terminal for receiving scrambled data supplied from an information supplier in which scrambled data is supplied from said information supplier and is divided into first data including at least compressed video data and second data including at least a decode key for using the descrambling of said video data, the terminal comprising:
    a data request cirquit for transmitting a data request signal to said information supplier;
    a decode key memory for storing said second data;
    a multiplexing circuit for multiplexing said first data and an identification code for identifying said data receiver terminal or a user;
    a data recording/reproducing apparatus for being able to record and reproduce multiplexed data output from said multiplexing circuit;
    an extracting circuit for extracting said identification code from said multiplexed data reproduced from said data recording/reproducing apparatus;
    a comparator for comparing said identification code extracted by said extracting circuit with said identification code provided by said multiplexing circuit;
    a descrambling circuit for descrambling said compressed video data of said multiplexed data reproduced from said data recording/reproducing apparatus; and wherein
    said first data received from said information supplier responding to said data request signal for requesting said first data is stored in said data recording/reproducing apparatus after being multiplexed with said identification code by said multiplexing circuit, said second data received from said information supplier responding to said data request signal for requesting said second data is stored in said decode key memory, and the descrambling circuit descrambles said compressed video data of said first data included in said multiplexed data output from said data recording/reproducing apparatus using said decode key included in said second data stored in said decode key memory, only when the descrambling of said compressed video data is permitted according to the result of a comparison performed by said comparator.

22. The data receiver terminal claimed in claim 21, wherein
    said first data further includes program information having different value for each said compressed video data for identifying said compressed video data;
    said data receiver terminal further provides a program information processing circuit for distinguishing program information included in said first data;
    said data request signal for requesting said first data includes at least said identification code identifying said data receiver terminal or said user; and
    said data request signal for requesting said second data includes at least said identification code and said program information distinguished by said program information processing circuit.

23. The data receiver terminal claimed in claim 22, wherein:

said data receiver terminal is billed only once a receiving charge for receiving said scrambled data supplied from said information supplier at least on the basis of said program information and said identification code included in said data request signal for requesting said second data transmitted from said transmitter to said information supplier, when said scrambled data is newly descrambled a plurality of times within a specific period by said descrambling circuit.

24. The data receiver terminal claimed in claim 22, wherein:

said data receiver terminal is billed a receiving charge for receiving said scrambled data supplied from said information supplier on the basis of at least said program information and said identification code included in said data request signal for requesting said second data transmitted to said information supplier from said data request circuit.

25. A data receiver terminal for receiving data supplied from an information supplier comprising:

a multiplexing circuit for multiplexing said data and an identification code identifying said data receiver terminal or a user;

a data recording/reproducing apparatus for being able to record and reproduce a multiplexed data output from said multiplexing circuit;

an extracting circuit for extracting said identification code from said multiplexed data reproduced from said data recording/reproducing apparatus;

a comparator for comparing said identification code extracted by said extracting circuit with said identification code provided by said multiplexing circuit;

a control circuit for controlling outputting of said data of said multiplexed data reproduced from said data recording/reproducing apparatus;

wherein said control circuit outputs said data only when the reference of said data is permitted according to result of a comparison of said identification code extracted by said extracting circuit with said identification code multiplexed in said multiplexing circuit performed by said comparator.

26. The data receiver terminal claimed in claim 25, wherein said data includes at least one error detecting code, and said receiver terminal provides an error check circuit which confirms a correction of said supplied data with referring said error detecting code; and a retransmission of said data is requested to said information supplier when said error check circuit confirms a transmission error of said supplied data in said error detecting code.

27. A data receiver terminal claimed in claim 25, wherein said data includes at least compressed video dataand program information having a different value for each said compressed video data for identifying said compressed video data; and said data receiver terminal further provides a program information processing circuit for distinguishing said program information included in said supplied data and a transmission circuit for transmitting data to said information supplier;

at least said program information identified by the program information processing circuit and said identification code identifying said data receiver terminal or said user are transmitted to said information supplier.

28. The data receiver terminal claimed in claim 27, wherein said data receiver terminal is billed a receiving charge for receiving said data supplied from said information supplier at least on the basis of said program information and said identification code transmitted from said transmission circuit to said information supplier.

29. The data receiver terminal claimed in claim 27, wherein a charge for receiving said data is billed only once when said data is outputted from said control circuit a plurality of times within a specific period at least on the basis of said program information and said identification code transmitted from said transmission circuit to said information supplier.

30. A data receiver terminal for receiving data supplied from an information supplier comprising:

a multiplexing circuit for multiplexing said data and an identification code identifying said data receiver terminal or a user;

an output terminal for outputting a multiplexed data output from said multiplexing circuit;

an input terminal for inputting said multiplexed data;

an extracting circuit for extracting said identification code from said multiplexed data input from said input terminal;

a comparator for comparing said identification code extracted by said extracting circuit with said identification code provided by said multiplexing circuit;

a control circuit for controlling outputting of said data of said multiplexed data input from said input terminal;

wherein said control circuit outputs said data only when the reference of said data is permitted according to result of a comparison of said identification code extracted by said extracting circuit with said identification code multiplexed in said multiplexing circuit performed by said comparator.

31. The data receiver terminal claimed in claim 30, wherein said data includes at least one error detecting code;

said data receiver terminal provides an error check circuit which confirms a correction of said supplied data with referring said error detecting code; and a retransmission of said data is requested to said information supplier when said error check circuit confirms a transmission error of said supplied data in said error detecting code.

32. A data receiver terminal claimed in claim 30, wherein said data includes at least compressed video data and program information having a different value for each said compressed video data for identifying said compressed video data;

said data receiver terminal further provides a program information processing circuit for distinguishing said program information included in said supplied data and a transmission circuit for transmitting data to said information supplier; and wherein at least said program information identified by the program information processing circuit and said identification code identifying said data receiver terminal or said user are transmitted to said information supplier.

33. The data receiver terminal claimed in claim 32, wherein said data receiver terminal is billed a receiving charge for receiving said data supplied from said information supplier at least on the basis of said program information and said identification code transmitted from said transmission circuit to said information supplier.

34. The data receiver terminal claimed in claim 32, wherein a charge for receiving said data is billed only once when said data is outputted from said control circuit a plurality of times within a specific period at least on the basis of said program information and said identification code transmitted from said transmission circuit to said information supplier.

35. A data receiver terminal for receiving data supplied from an information supplier comprising:

a multiplexing circuit for multiplexing said data and an identification code identifying said data receiver terminal or a user;

an input/output terminal for proceeding suitably interchangeably to input multiplexed data of said supplied data and an identification code, and to output a multiplexed data output from said multiplexing circuit;

an extracting circuit for extracting said identification code from said multiplexed data input from said input/output terminal;

a comparator for comparing said identification code extracted by said extracting circuit with said identification code provided by said multiplexing circuit;

a control circuit for controlling outputting of said data of said multiplexed data input from said input/output terminal;

wherein said control circuit outputs said data only when the reference of said data is permitted according to result of a comparison to said identification code extracted by said extracting circuit with said identification code multiplexed in said multiplexing circuit performed by said comparator.

36. The data receiver terminal claimed in claim 35, wherein said data includes at least one error detecting code;

said data receiver terminal provides an error check circuit which confirms a correction of said supplied data with referring said error detecting code; and a retransmission of said data is requested to said information supplier when said error check circuit confirms a transmission error of said supplied data in said error detecting code.

37. A data receiver terminal claimed in claim 35, wherein said data includes at least compressed video data and program information having a different value for each said compressed video data for identifying said compressed video data;

said data receiver terminal further provides a program information processing circuit for distinguishing said program information included in said supplied data and a transmission circuit for transmitting data to said information supplier; and wherein at least said program information identified by the program information processing circuit and said identification code identifying said data receiver or said user are transmitted to said information supplier.

38. The data receiver terminal claimed in claim 37, wherein said data receiver terminal is billed a receiving charge for receiving said data supplied from said information supplier at least on the basis of said program information and said identification code transmitted from said transmission circuit to said information supplier.

39. The data receiver terminal claimed in claim 37, wherein a charge for receiving said data is billed only once when said data is outputted from said control circuit a plurality of times within a specific period at least on the basis of said program information and said identification code transmitted form said transmission circuit to said information supplier.

* * * * *

UNITED STATES PATENT AND TRADEMARK OFFICE
CERTIFICATE OF CORRECTION

PATENT NO.    : 6,249,532 B1
DATED         : June 19, 2001
INVENTOR(S)   : Yoshikawa et al.

It is certified that error appears in the above-identified patent and that said Letters Patent is hereby corrected as shown below:

<u>Title page,</u>
Item [73], delete assignee "Hitachi Microcomputer Systems, Ltd.".

Signed and Sealed this

Fifteenth Day of October, 2002

*Attest:*

*Attesting Officer*

JAMES E. ROGAN
*Director of the United States Patent and Trademark Office*